US010053179B2

(12) United States Patent
Xie

(10) Patent No.: US 10,053,179 B2
(45) Date of Patent: Aug. 21, 2018

(54) FOLDABLE CYCLE AND FOLDABLE CYCLE FRAME

(71) Applicant: Beijing Onemile Technology Co., LTD., Beijing (CN)

(72) Inventor: Chunlei Xie, Beijing (CN)

(73) Assignee: Beijing Onemile Technology Co., LTD., Beijing (CN)

( * ) Notice: Subject to any disclaimer, the term of this patent is extended or adjusted under 35 U.S.C. 154(b) by 12 days.

(21) Appl. No.: 15/316,177

(22) PCT Filed: Aug. 12, 2016

(86) PCT No.: PCT/CN2016/094841
§ 371 (c)(1),
(2) Date: Dec. 4, 2016

(87) PCT Pub. No.: WO2017/025063
PCT Pub. Date: Feb. 16, 2017

(65) Prior Publication Data
US 2017/0158279 A1    Jun. 8, 2017

(30) Foreign Application Priority Data

Aug. 13, 2015  (CN) ..................... 2015 2 0606493 U
Dec. 30, 2015  (CN) ........................ 2015 1 1006994
(Continued)

(51) Int. Cl.
*B62K 15/00* (2006.01)
*B62M 7/12* (2006.01)
(Continued)

(52) U.S. Cl.
CPC ............. *B62K 15/008* (2013.01); *B62J 1/002* (2013.01); *B62J 25/00* (2013.01); *B62K 11/14* (2013.01);
(Continued)

(58) Field of Classification Search
CPC ...... B62K 15/008; B62K 23/06; B62K 11/14; B62K 2208/00; B62K 2206/00;
(Continued)

(56) References Cited

U.S. PATENT DOCUMENTS 3,990,717 A * 11/1976 Best ...................... B62K 15/008
280/278
4,111,447 A * 9/1978 Ishida .................. B62K 15/008
280/261
(Continued)

*Primary Examiner* — Darlene P Condra
(74) *Attorney, Agent, or Firm* — Raymond Y. Chan; David and Raymond Patent Firm

(57) ABSTRACT

The present invention provides a foldable electric vehicle and a foldable vehicle frame thereof, wherein the foldable electric vehicle comprises a front frame adapted for being pivotally arranged on a vehicle body of a cycle, a back frame adapted for being pivotally arranged on a vehicle body of a cycle and an actuating arm arranged between the front frame and the back frame, wherein the actuating arm forms a front end and a rear end, wherein the front frame is pivotally arranged on the front end of the actuating arm, and the back frame is pivotally arranged on the rear end of the actuating arm.

15 Claims, 24 Drawing Sheets

(30) Foreign Application Priority Data

| Aug. 11, 2016 | (CN) | 2016 1 0658601 |
|---|---|---|
| Aug. 11, 2016 | (CN) | 2016 1 0658603 |
| Aug. 11, 2016 | (CN) | 2016 2 0869454 U |
| Aug. 11, 2016 | (CN) | 2016 2 0871637 U |
| Aug. 12, 2016 | (WO) | PCT/CN2016/094841 |

(51) Int. Cl.
    *B62K 11/14*     (2006.01)
    *B62K 23/06*     (2006.01)
    *B62J 1/00*     (2006.01)
    *B62J 25/00*     (2006.01)

(52) U.S. Cl.
    CPC ............ *B62K 23/06* (2013.01); *B62M 7/12* (2013.01); *B62K 2204/00* (2013.01); *B62K 2206/00* (2013.01); *B62K 2208/00* (2013.01)

(58) Field of Classification Search
    CPC ....... B62K 2204/00; B62J 25/00; B62J 1/002; B62M 7/12
    See application file for complete search history.

(56) References Cited

U.S. PATENT DOCUMENTS

| 4,284,288 | A | * | 8/1981 | Fulton | B62K 15/006 280/278 |
|---|---|---|---|---|---|
| 4,441,729 | A | * | 4/1984 | Underwood | B62K 15/00 280/278 |
| 4,491,337 | A | * | 1/1985 | Zuck | B62K 15/006 280/231 |
| 5,269,550 | A | * | 12/1993 | Hon | B62K 15/006 280/278 |
| 6,032,971 | A | * | 3/2000 | Herder | B62K 15/008 280/278 |
| 6,364,335 | B1 | * | 4/2002 | Mombelli | B62K 15/008 280/278 |
| 6,595,539 | B1 | * | 7/2003 | Belli | B62K 15/008 280/278 |
| 7,584,978 | B2 | * | 9/2009 | Pourias | B62K 15/008 280/278 |
| 9,033,089 | B2 | * | 5/2015 | Theodore | B62D 31/006 180/208 |
| 9,604,688 | B1 | * | 3/2017 | Yang | B62K 15/008 |
| 9,873,477 | B2 | * | 1/2018 | Wunderlin | B62K 15/008 |
| 2005/0218624 | A1 | * | 10/2005 | Sherman | B62K 15/006 280/278 |
| 2006/0087095 | A1 | * | 4/2006 | Huang | B62K 15/006 280/278 |
| 2007/0210556 | A1 | * | 9/2007 | Hon | B62K 15/008 280/287 |
| 2009/0096187 | A1 | * | 4/2009 | Lapierre | A45C 5/04 280/287 |

* cited by examiner

FOLDABLE CYCLE AND FOLDABLE CYCLE FRAME

CROSS REFERENCE OF RELATED APPLICATION

This is a non-provisional application that claims priority to international application number PCT/CN2016/094841, international filing date Aug. 12, 2016, which claims priority to Chinese application number CN201520606493.3, filing date Aug. 13, 2015, Chinese application number CN201511006994.9, filing date Dec. 30, 2015, Chinese application number CN201610658603.X, filing date Aug. 11, 2016, Chinese application number CN201620871637.2, filing date Aug. 11, 2016, Chinese application number CN201610658601.0, filing date Aug. 11, 2016, Chinese application number CN201620899454.7, filing date Aug. 11, 2016, the entire contents of each of which are expressly incorporated herein by reference.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a foldable vehicle frame for cycles. The present invention further relates to a foldable electric vehicle. The present invention further relates to the field of foldable products, and, specifically, to new draw cord quick unlocking and folding mechanism. The present invention further relates to a bike saddle.

Description of Related Arts

Generally, a cycle refers to a means of transportation driven with power sources, such as manpower, electric power, engine, etc., so as to carry personnel and/or objects to move fast. Although various cycles are able to carry a lot of people under certain conditions, most of conventional cycles are designed to carry only one person or an appropriate amount of object. Common human-powered cycles, such as bicycles, utilize the stepping force of the user as the driving force to self-drive and move. Electric drive cycles, such as electric bikes, electric scooters, electric cars, etc., use electricity as the power to drive themselves to move. Engine drive cycles, such as motorcycles, employ the driving power produced by the engine as the driving force to drive themselves to move.

Numerous conventional cycles are not foldable. Therefore, they will have larger sizes and weights and be difficult to be brought into public transport means, such as buses and taxies. As a result, it limits the use of cycle to a great extent. In order to solve the drawbacks of the large size and difficulty of carrying of the cycle, the researcher has developed a cycle that has a foldable structure. When a cycle becomes foldable, it occupies less space when folded, so as to be easy to carry, transport, and place for the user. Nevertheless, most of the conventional foldable cycle have at least one of the following drawbacks. First, the folding mechanisms of conventional foldable cycle usually cannot achieve both the smallest size when folded and a stable support for the user to ride when unfolded. Conventional cycles either have smaller sizes after folded, but have difficulty for the users to rid with and/or do not provide steady supporting structures when unfolded, or provide steady supporting structures and do not have difficulty for the users to rid with when unfolded, but have relatively large size and weight, which is hard to carry with, when folded. Next, the foldable structure is complex and the folding procedures are intricate and not user-friendly. Again, in order to achieve the foldability, the design of the overall structure of the cycle becomes unsafe. Especially, in order to make the overall structure of the cycle foldable, it can cause the overall structure thereof become not reasonable and unable to afford flexible operation and stable support in the riding process of the cycle. Also, when a conventional foldable cycle is folded, it usually has irregular appearance, such as forming bulges or ridges, which makes it easily to be damaged as being carried or placed. For example, China Pat. No. CN201310302198.4 provides a foldable cycle (electric vehicle), wherein the foldable cycle has a front vehicle frame, a central body, a back vehicle frame, and two foldable connecting rods. The foldable cycle according to the China patent thereof allows the central body to be lifted via a lifting handle, so that both the front vehicle frame and the back vehicle frame will naturally approach to the central body and fold together under the action of gravity. The foldable cycle disclosed in that patent contains several drawbacks. First, a user has to lift its central body to carry out the folding, which causes that, during the folding process of that foldable cycle, the user has to lift the central body and overcome it from the bottom up, or even to overcome the weight of the entire cycle, which brings difficulty to the folding of the foldable cycle. Next, the structure of the foldable cycle is complicated. Even when it is folded, it still has a relatively large size and heavy weight. Again, the folding method of the foldable cycle is to lift the central body thereof, so as to make both the front vehicle frame and the back vehicle frame to fold toward the central body. Therefore, even if the foldable cycle is folded, it still has a relatively large size and heavy weight. Lastly, there are too many pivot-points of the foldable cycle, which causes the overall folding structure unstable.

An electric vehicle (or electric bike) usually refers to a ridable vehicle that utilizes accumulator cell(s) as its auxiliary energy supply. An electric vehicle can be used for carrying passenger(s) and/or goods. Because of electric vehicle is brisk, convenient, and flexible, it has become a common conveyance.

Conventional electric vehicles mostly have larger sizes and weights, and are difficult to be brought into public transport means big such as buses and taxies, which limits the use of electric vehicle to a great extent. In order to solve the drawbacks of the large size and difficulty of carrying of the electric vehicle, the researcher has developed an electric vehicle that has a foldable structure. However, the biggest difference between an electric vehicle and a bicycle is that the former has a power unit installed for providing power. Besides, the power unit, on the other hand, increases the overall weight and volume of an electric vehicle. Most of the conventional foldable electric vehicle have at least one of the following drawbacks. First, the folding mechanisms of conventional foldable electric vehicle usually cannot achieve both the smallest size when folded and a stable support for the user to ride when unfolded. Conventional electric vehicle either have smaller sizes after folded, but have difficulty for the users to rid with and/or do not provide steady supporting structures when unfolded, or provide steady supporting structures and do not have difficulty for the users to rid with when unfolded, but have relatively large size and weight, which is hard to carry with, when folded. Next, the structure is complex and the folding procedures are intricate and not user-friendly. Again, in order to achieve the foldability, the design of the overall structure of the electric vehicle becomes unsafe. Especially, in order to make the overall structure of the electric vehicle foldable, it can cause the overall structure thereof become not reasonable and unable to afford flexible operation and stable support in the riding process of the electric vehicle. Also, when a conventional foldable electric vehicle is folded, it usually has irregular appearance, which makes it easily to be damaged as being carried or placed. Lastly, after an electric vehicle is folded, it cannot be pulled or pushed to move, but to be carried on the shoulder or with the hand of the user. For example, China Pat. No. CN201310302198.4 provides a foldable electric vehicle, wherein the foldable electric vehicle has a front vehicle frame, a central body, a back vehicle frame, and two foldable connecting rods. The foldable electric vehicle according to the patent allows the central body thereof to be lifted via a lifting handle, so that both the front vehicle frame and the back vehicle frame will naturally approach to the central body and fold together under the action of gravity. The foldable electric vehicle disclosed in that patent contains several drawbacks. First, a user has to lift its central body to carry out the folding, which causes that, during the folding process of that foldable electric vehicle, the user has to lift the central body and overcome it from the bottom up, or even to overcome the weight of the entire electric vehicle, which brings difficulty to the folding of the foldable electric vehicle. Next, the structure of the foldable electric vehicle is complicated. Even when it is folded, it still has a relatively large size and heavy weight. Again, the folding method of the foldable electric vehicle is to lift the central body thereof, so as to make both the front vehicle frame and the back vehicle frame to fold toward the central body. Therefore, even if the foldable electric vehicle is folded, it still has a relatively large size and heavy weight. Lastly, there are too many hinges of the foldable electric vehicle, which causes the overall folding structure unstable.

Therefore, people need an electric vehicle with a more stable foldable structure.

Bicycles, fitness equipment, etc. all relate to foldable mechanism, so as to be folded for storing, handling, and transporting. Especially for the folding bicycles, they usually have frame, folding joints, and stem folding joint as their main structure. By folding the frame, both the front and back wheels can be folded together, so as to reduce about 45% of the length. The entire bike, when it is folded, can be put into a boarding bag, folding package, or car trunk. The folding process does not require external tools. Rather, the bike can be folded and unfolded manually. When folded, it utilizes a seat post as a point of support to stand firm. Folding bicycles are easy to carry with, easy to operate, and having mature manufacturing technique. Unfortunately, folding locks of these conventional products contain complex structures, which require unlocking the safety lock and manually opening the handle before folding. The operation is complicated. In addition, because the bikes are completely made of metal, they are relatively heavy, so entire products can be cumbersome and difficult to operate and transport, which require further improvement.

A bike saddle is an indispensable component installed on the seat post of the bike to provide sitting posture support. It is a critical component to decide the comfort level of ridding.

Conventional bike saddles in the market occupy relatively large space, which makes storing and transport difficult. Besides, all conventional saddles apply arch structure.

SUMMARY OF THE PRESENT INVENTION

A main object of the present invention to provide a foldable cycle frame for cycle, wherein when the foldable cycle frame is folded, it has a smaller size, so as to be carried or dragged by the user, while when it is unfolded, it can provide steady support for the cycle.

Another object of the present invention is to provide a foldable cycle frame for cycle, wherein the foldable cycle frame has simple structure and is to fold.

Another object of the present invention is to provide a foldable cycle frame for cycle, wherein when the foldable cycle frame is folded, its shape becomes more regular and it does not bump another object easily.

Another object of the present invention is to provide a foldable cycle frame for cycle, wherein when the foldable cycle frame is folded, its front frame and back frame are both folded in the cycle body of the cycle.

Another object of the present invention is to provide a foldable cycle frame for cycle, wherein the foldable cycle frame is arranged on the cycle body of the cycle, so that when foldable cycle frame is unfolded, the back frame of the cycle frame and the supporting element can form a stable triangular structure with the cycle body of the cycle.

Another object of the present invention is to provide a foldable cycle frame for cycle, wherein when the foldable cycle frame is folded, the cycle frame is able to bring the entire cycle to be folded, such that the folded cycle will have a smaller size.

Another object of the present invention is to provide a foldable cycle frame for cycle, wherein when the foldable cycle frame is unfolded, the foldable cycle frame is able to turn the cycle into a steady support for the user.

Another object of the present invention is to provide a foldable cycle frame for cycle, wherein when the foldable cycle frame is folded, the back frame of the foldable cycle frame is folded and received in the receiving groove formed by the cycle body of the cycle.

Another object of the present invention is to provide a foldable electric vehicle, wherein when the foldable electric vehicle has a smaller size in the folded state and is able to provide steady support for the user in the unfolded state.

Another object of the present invention is to provide a foldable electric vehicle, wherein the foldable electric vehicle has simple structure and is to fold.

Another object of the present invention is to provide a foldable electric vehicle, wherein when the foldable electric vehicle is folded, its shape becomes more regular and it does not bump another object easily.

Another object of the present invention is to provide a foldable electric vehicle, wherein when the foldable electric vehicle is folded, its front vehicle frame and back vehicle frame are both folded in the vehicle body.

Another object of the present invention is to provide a foldable electric vehicle, wherein when the foldable electric vehicle is unfolded, the vehicle body of the foldable electric vehicle, the back frame of the vehicle frame, and the supporting element form a stable triangular structure.

Another object of the present invention is to provide a vehicle frame for foldable electric vehicle, wherein when the vehicle frame is folded, the vehicle frame is able to bring the entire electric vehicle to be folded, such that the folded electric vehicle will have a smaller size.

Another object of the present invention is to provide a vehicle frame for foldable electric vehicle, wherein when the vehicle frame is unfolded, the vehicle frame is able to turn the electric vehicle into a steady support for the user.

Another object of the present invention is to provide a vehicle frame for foldable electric vehicle, wherein when the vehicle frame is folded, the back frame of the vehicle frame is folded and received in the receiving groove formed by the vehicle body of the electric vehicle.

Another object of the present invention is to provide a vehicle frame for foldable electric vehicle, wherein when the vehicle frame is unfolded, the back frame of the vehicle frame, the supporting element, and the vehicle body form a stable triangular structure, so as to provide a steady support for the motorist(s). When the vehicle frame is folded, the supporting element and the back frame of the vehicle frame are folded in the receiving groove formed by the vehicle body of the electric vehicle.

Other objects and features of the present invention are reflected in the following detail description and can be achieved by the combination(s) of the method and device specifically pointed out in the appended claims.

According to the present invention, the foldable cycle frame for cycle, which is able to achieve the above objects and other objects and advantage of the present invention, includes:

a front frame, adapted for being pivotally arranged on a cycle body of a cycle;

a back frame, adapted for being pivotally arranged on a cycle body of a cycle; and an actuating arm, arranged between the front frame and the back frame, wherein the actuating arm forms a front end and a rear end, wherein the front frame is pivotally arranged on the front end of the actuating arm, while the back frame is pivotally arranged on the rear end of the actuating arm.

The present invention further provides a foldable electric vehicle that includes:

a vehicle body;

a front body, pivotally arranged on a front of the vehicle body;

a vehicle frame, arranged on a rear of the vehicle body;

a power unit, adapted for providing power to the foldable electric vehicle;

a saddle, arranged on the vehicle frame;

a plurality of wheels, wherein the wheels are respectively arranged at the vehicle body and the front body; two handles, respectively arranged on the front body; and a driving motor, electronically connected with the power unit and connected with at least a wheel, so as to drive the wheel to rotate and drive the foldable electric vehicle to move, wherein the vehicle frame includes a back frame pivotally arranged on the rear of the vehicle body, wherein the vehicle body forms a receiving groove, wherein the foldable electric vehicle has an unfolded state and a folded state, wherein when the foldable electric vehicle is in the unfolded state, the back frame of the vehicle frame will be kept unfolded and upright, so as to support and hold the saddle at a proper position, and the front body will be unfolded and kept apart from the vehicle body, while when the foldable electric vehicle is in the folded state, the back frame of the vehicle frame is capable of being folded that the folded back frame is capable of being received in the receiving groove of the vehicle body, and the front body is also allowed to be folded at the back frame that is received in the receiving groove.

The present invention further provides a foldable vehicle frame for an electric vehicle that includes a vehicle body, wherein the foldable vehicle frame includes:

a back frame, comprising a lower end adapted for being pivotally arranged on the lower end of the vehicle body and an upper end pivotally arranged on the lower end; a locking device unlockably arranged on an inner side of the back frame, wherein the locking device has a locked state and a unlocked state, wherein when the locking device is in the locked state, the lower end and the upper end of the back frame are stably locked together, while when the locking device is in the unlocked state, the upper end of the back frame can freely pivot and shift relatively to the lower end; and a supporting element, wherein an end of the supporting element is adapted for being pivotally arranged on the upper end of the back frame, while another end of the supporting element is pivotally arranged on the vehicle body, so that when the back frame is held upright, the vehicle body and the supporting element can form a triangular structure.

A further object of the present invention is to provide a new draw cord quick unlocking and folding mechanism with a simple structure, rational design, and ease of operation to improve on the drawbacks and insufficiency of the prior art. The new draw cord quick unlocking and folding mechanism applies a draw cord mechanism to achieve the unlocking and opening process in one step, which saves the unlocking process. In addition, it has light overall weight, which greatly helps the users to store and handle it and increases the practical performance thereof.

In order to achieve the above objects, a technical solution of the present invention includes a upper pole, a lower pole, a main spindle of folding pole, a first spindle, a quick release handle, a propping spring, a second spindle, a prop, a torsion spring, and a third spindle, wherein the upper pole and the lower pole are connected via the main spindle of folding pole, wherein a side of a lower part of the upper pole is connected with the quick release handle via the first spindle, wherein the quick release handle is connected with the prop in the inside thereof via the second spindle, wherein a side of the prop and a propping block on the inner wall of the quick release handle has a propping spring therebetween, wherein an upper part of the prop couples with a lug of the top of the lower pole. The technical solution further includes a security block, a fourth spindle, and a draw cord, wherein the lower part of the prop has a security block connected thereto via the third spindle, wherein an end of the security block has a torsion spring, while a lower part of another end of the security block is connected with a draw cord via the fourth spindle, wherein a catch on the security block couples with a catch groove on the side wall of the quick release handle, wherein the quick release handle has a unlocking notch on the side wall thereof, wherein the unlocking notch and the catch groove are integral structure.

The operation steps of the present invention are as follows.

First, when the catch of the security block couples with the catch groove on the quick release handle, the prop props the lug on the lower pole rendering the whole in a locking condition that cannot be opened by pulling the quick release handle directly as long as the draw cord is not drawn.

Second, when unlocking is required, the draw cord can be drawn to bring the security block to rotate around the third spindle, so the catch on the security block can enter the unlocking notch. As the security block unlocks, the prop will be loosened.

Third, when the draw cord is further drawn, the quick release handle can be pulled open. In other words, drawing the draw cord can complete the unlock process and pull open the quick release handle in one step, which saves the unlock process.

The advantages of the present invention, by applying the above structure, includes that the new draw cord quick unlocking and folding mechanism according to the present invention can use the draw cord mechanism to complete both the unlocking and opening processes in one step, which saves the unlocking process, lowers the overall weight, helps the user to store and manage the device, enhances its practicability, simplifies its structure, makes its design sensible, reduces its costs, etc.

A further object of the present invention is to provide an arch-less bike saddle with a simple structure, rational design, and ease of operation to improve on the drawbacks and insufficiency of the prior art. The bike saddle allows flipping forward or backward to reduce its storage volume, which also eases the transportation and provides more comfort in riding.

In order to solve the problems of the conventional technology, the present invention applies a technical solution that includes a seat post, a saddle body, a cavity, an unlock button, and a latch. The saddle body is arranged above the seat post. The seat post is a shock proof seat post that has damping spring therein, so as to make the ridding process more comfortable. The saddle body has two pieces respectively on the right side and left side that have a cavity therebetween. The cavity applies a sunken design that the surface of the cavity is below the plane level of the saddle body, such that it can keep the prostate and reproductive organ of the rider from contacting the seat during the riding, which protects the reproductive health and provides cushioning effect to the saddle body. The unlock button is at the bottom of the cavity. The rear area of the cavity utilizes a latch to connect the seat post. The cavity uses honeycomb type of structural design, which not only enhances the strength thereof, but also increases the flexibility and greatly raises the comfort level of the seat. By applying the above structure, the benefits of the present invention include its simple structure, rational design, and ease of use. Also, the bike saddle can be backwardly or forwardly inverted to reduce the storage volume and make transport and carrying easier. Besides, it raises the comfort level of ridding and protects reproductive health as well.

Still further objects and advantages will become apparent from a consideration of the ensuing description and drawings.

These and other objectives, features, and advantages of the present invention will become apparent from the following detailed description, the accompanying drawings, and the appended claims.

Figure 14:
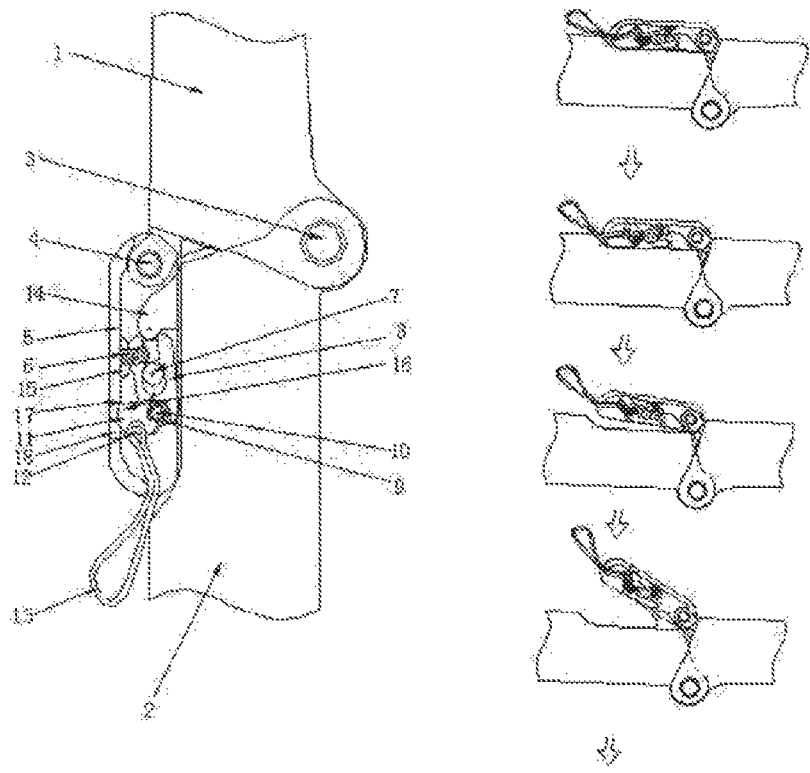
FIG. 14 is a structural perspective view of a draw cord quick unlocking and folding mechanism according to the above second preferred embodiment of the present invention.
Figure 15:
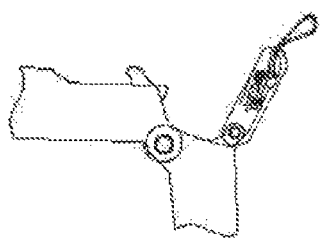
FIG. 15 is a flow diagram of the unlocking process of the draw cord quick unlocking and folding mechanism according to the above second preferred embodiment of the present invention.

The labels enclosed in FIGS. 14 and 15 are:
upper pole 1, lower pole 2, main spindle of folding pole 3, first spindle 4, quick release handle 5, propping spring 6, second spindle 7, prop 8, torsion spring 9, third spindle 10, security block 11, fourth spindle 12, draw cord 13, lug 14, propping block 15, catch 16, catch groove 17, and unlocking notch 18.

Figures 16, 17:
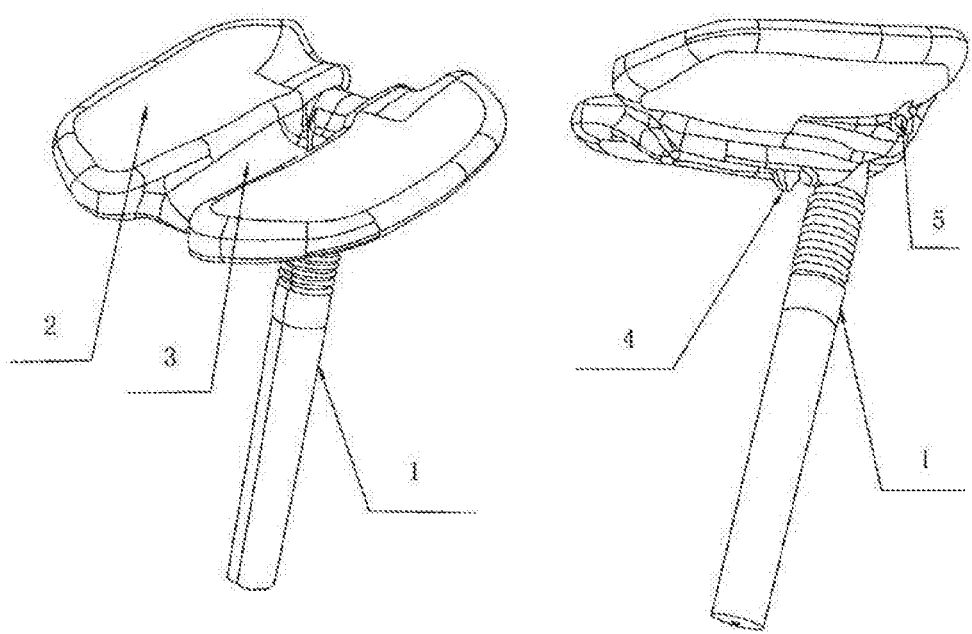

FIG. 16 is a structural perspective view of a bike saddle according to a third preferred embodiment of the present invention.

FIG. 17 illustrates an unlock button of a bike saddle according to the above third preferred embodiment of the present invention.

The labels enclosed in FIGS. 16 and 17 are:
seat post 1, saddle body 2, cavity 3, unlock button 4, and latch 5.

Figure 18:
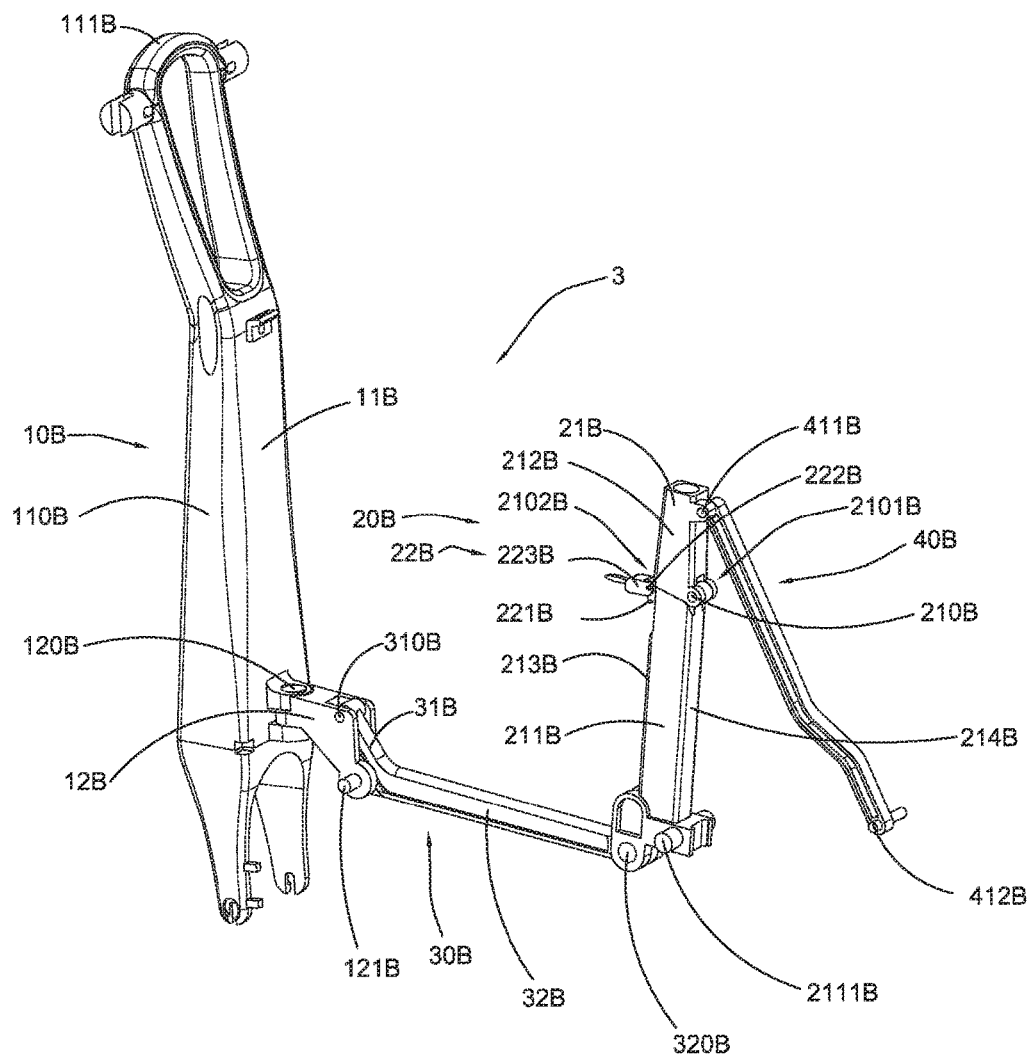

FIG. 18 refers to an 3D view of the foldable vehicle frame for cycle according to a fourth preferred embodiment of the present invention, wherein the foldable vehicle frame illustrated is in an unfolded state.

Figure 19:
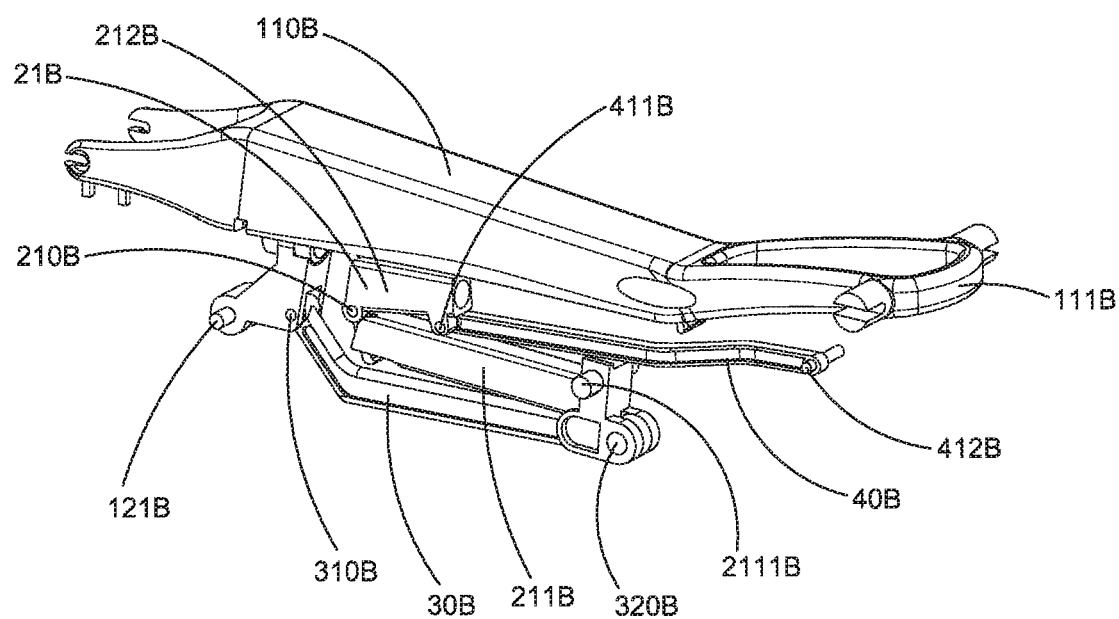

FIG. 19 refers to an 3D view of the foldable vehicle frame for cycle according to the above fourth preferred embodiment of the present invention, wherein the foldable vehicle frame illustrated is in a folded state.

Figure 20:
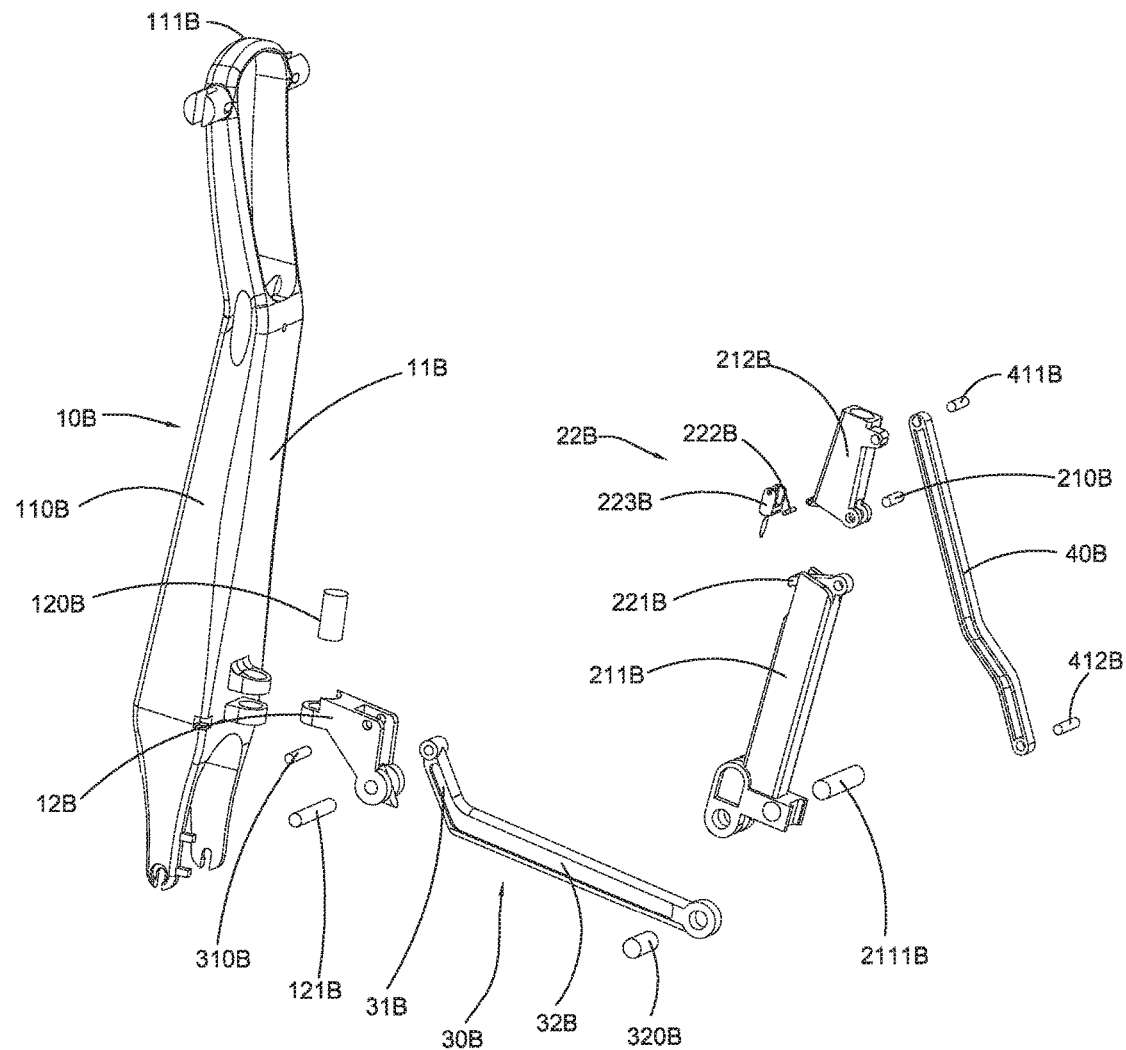

FIG. 20 is an exploded view of the foldable vehicle frame for cycle according to the above fourth preferred embodiment of the present invention.

Figure 21:
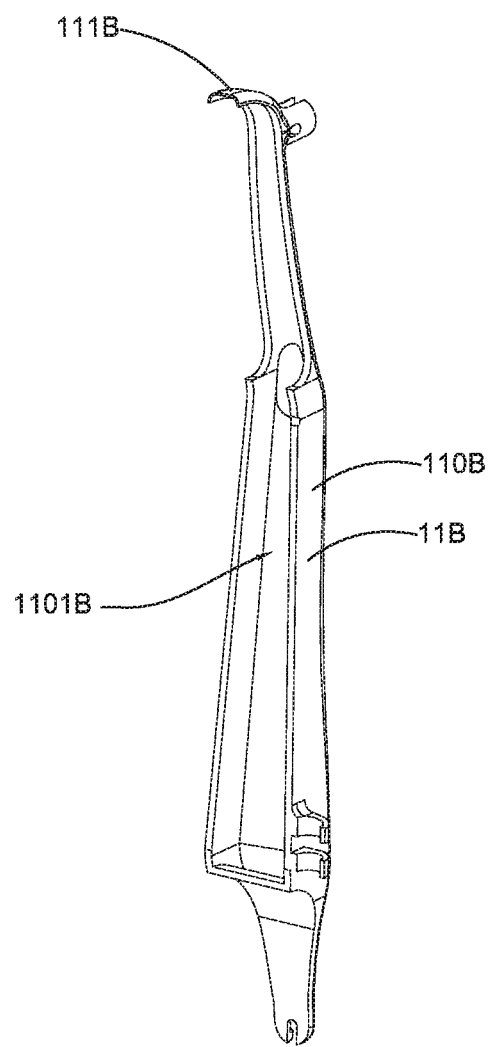

FIG. 21 is an exploded view of the front frame of the foldable vehicle frame for cycle according to the above fourth preferred embodiment of the present invention.

Figure 22:
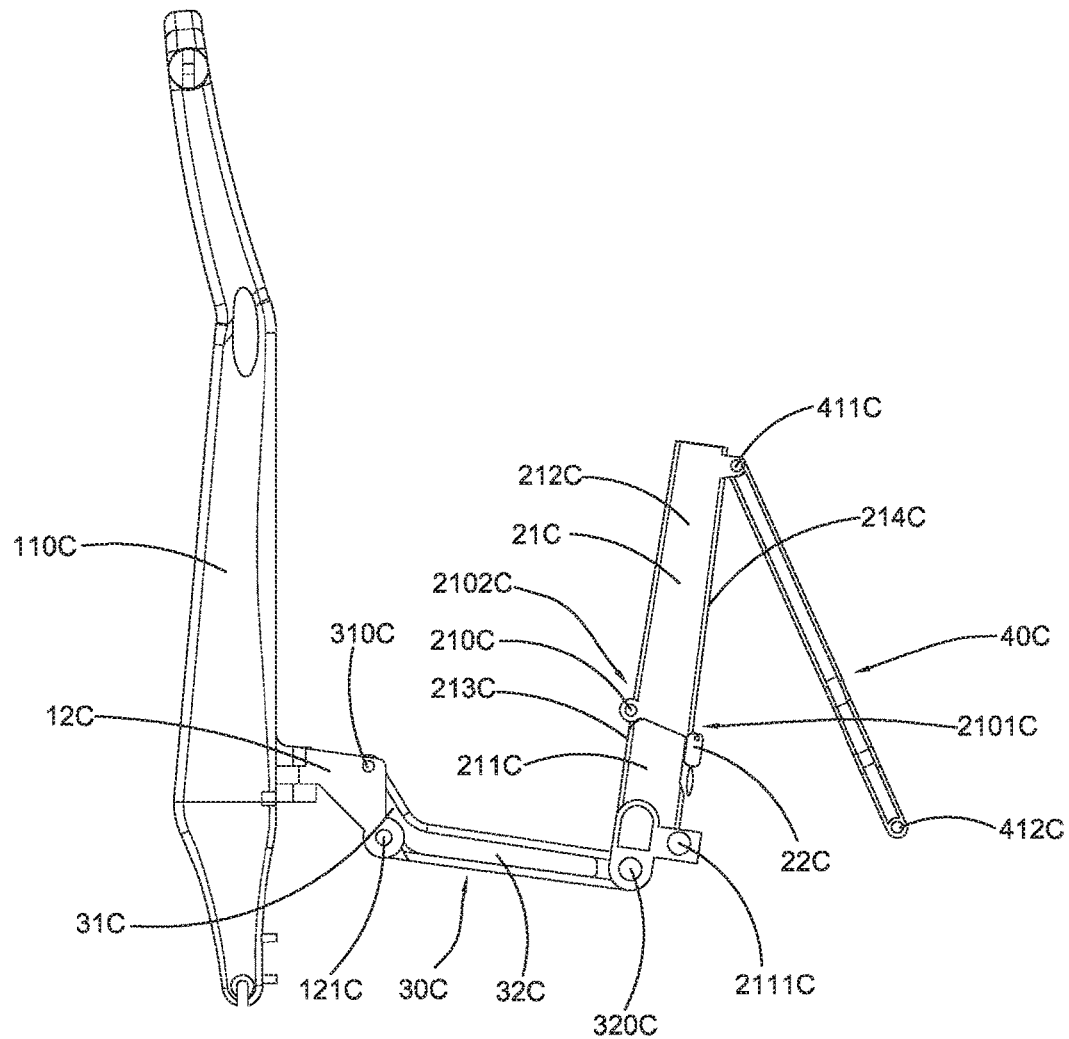

FIG. 22 refers to an alternative of the foldable vehicle frame for cycle according to the above fourth preferred embodiment of the present invention, wherein the foldable vehicle frame illustrated is in an unfolded state.

Figure 23:
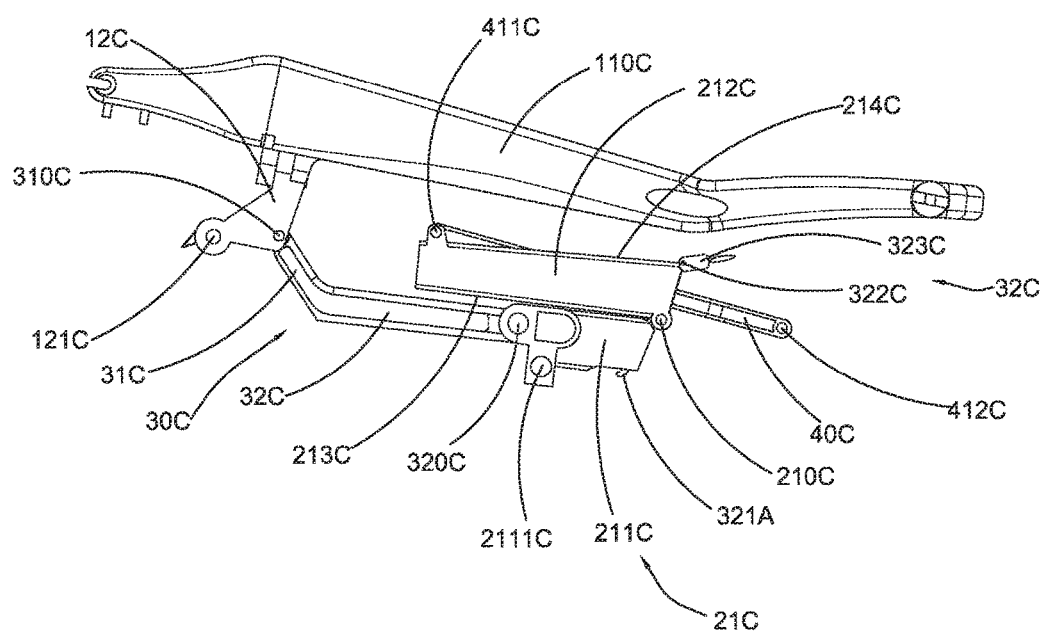

FIG. 23 refers to the alternative of the foldable vehicle frame for cycle according to the above fourth preferred embodiment of the present invention, wherein the foldable vehicle frame illustrated is in a folded state.

Figure 24:
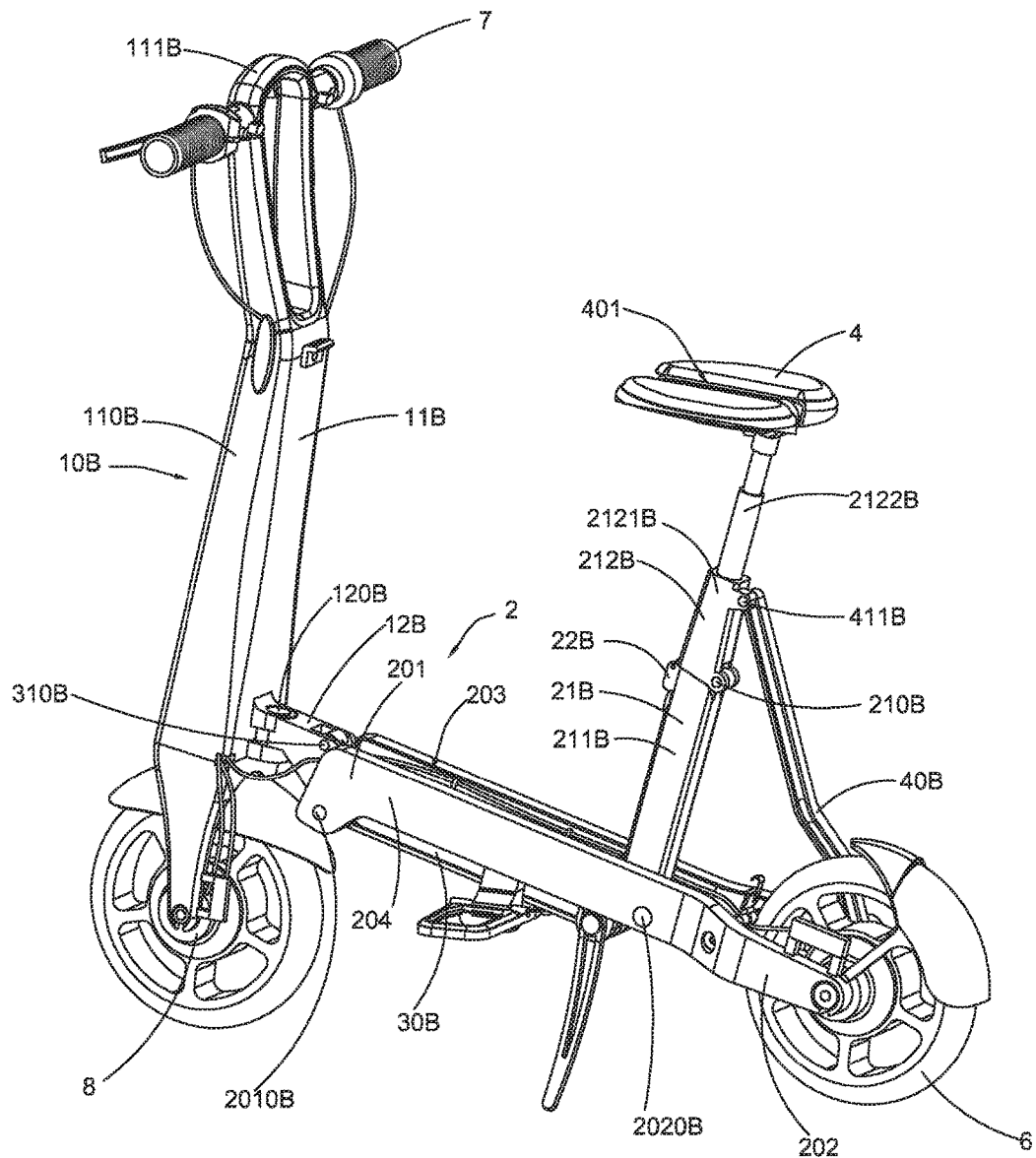

FIG. 24 is a 3D view of the exemplary cycle of the foldable vehicle frame according to the above fourth preferred embodiment of the present invention, wherein the electric vehicle illustrated is in an unfolded state.

Figure 25:
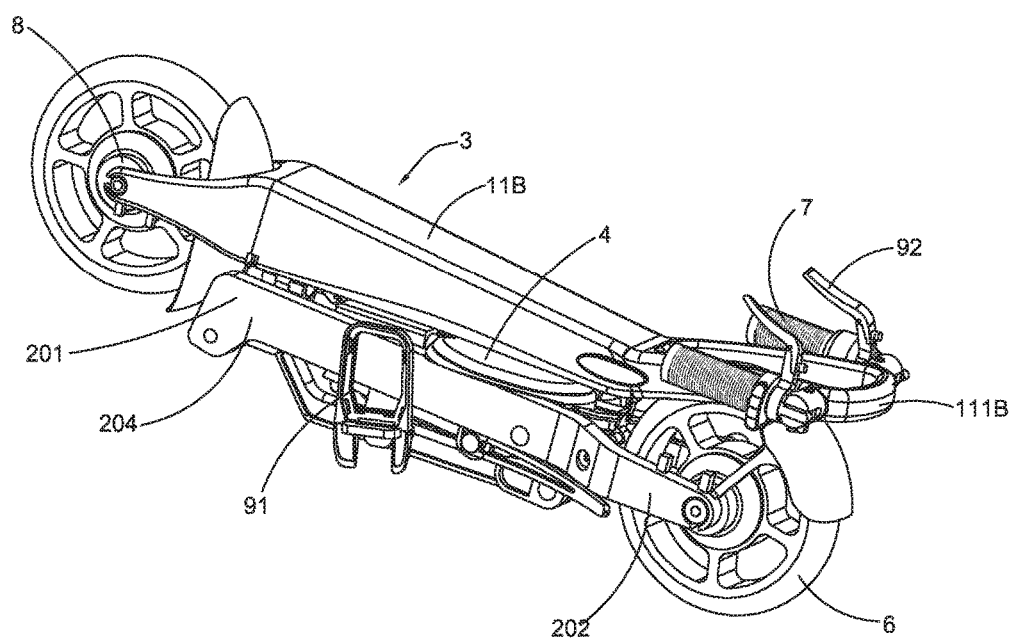

FIG. 25 is a 3D view of the exemplary cycle of the foldable vehicle frame according to the above fourth preferred embodiment of the present invention, wherein the electric vehicle illustrated is in a folded state.

Figure 26:
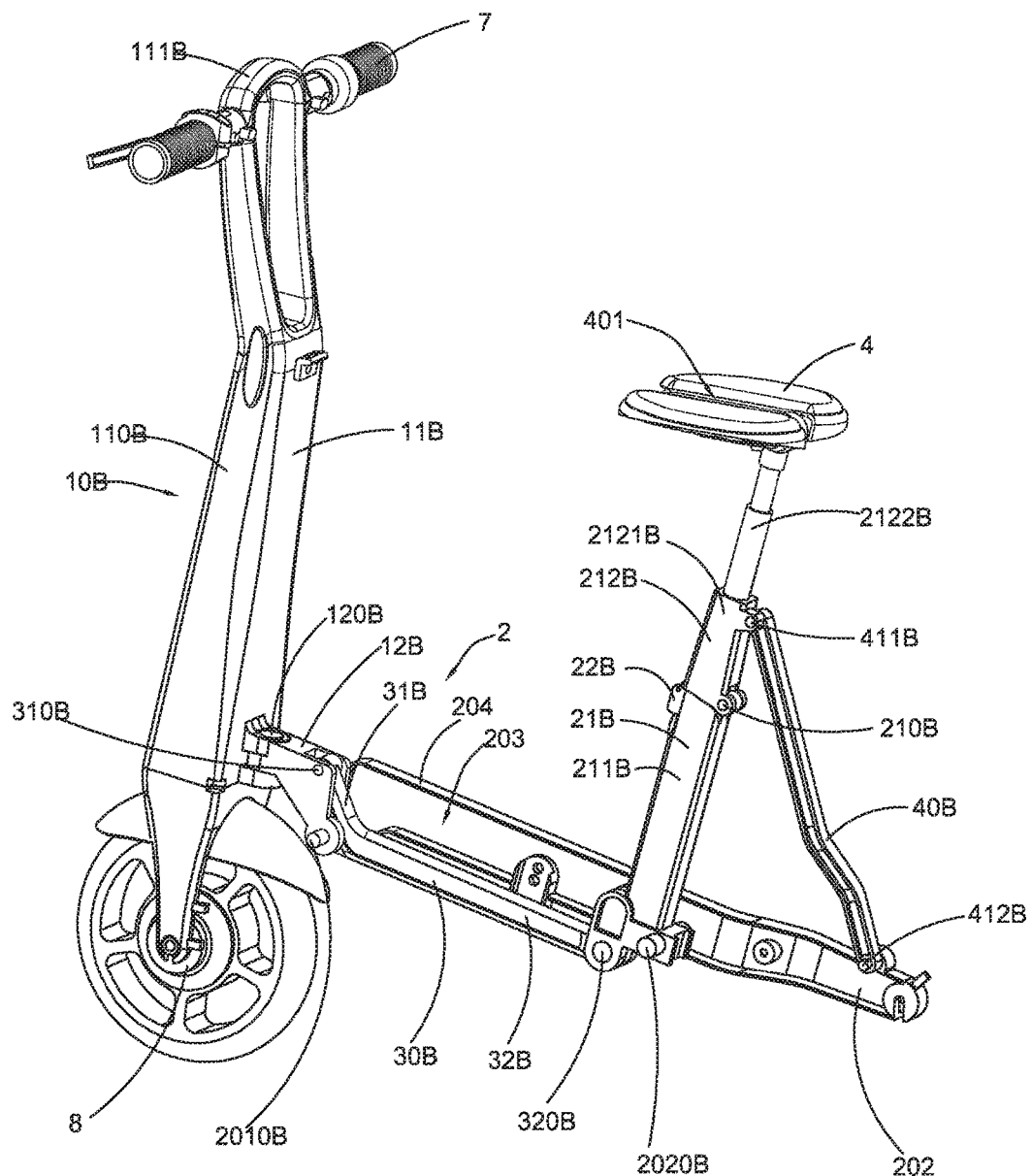

FIG. 26 is an exploded view of an exemplary cycle of the foldable vehicle frame according to the above fourth preferred embodiment of the present invention.

Figure 27:
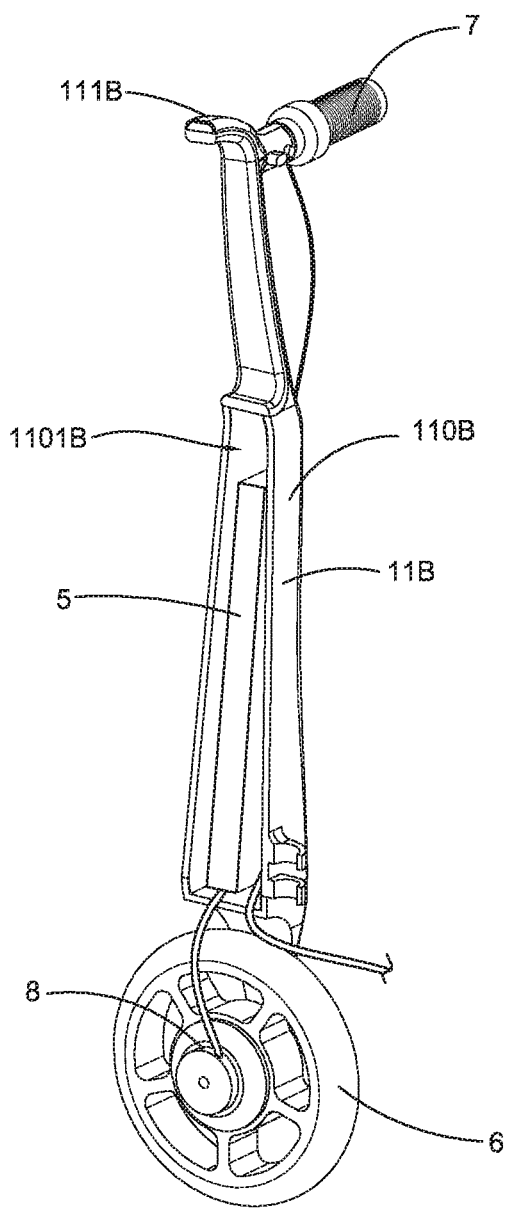

FIG. 27 is a sectional view of a front body of the exemplary cycle of the foldable vehicle frame according to the above fourth preferred embodiment of the present invention, illustrating a power unit and a motor of the exemplary cycle.

Figure 28A:
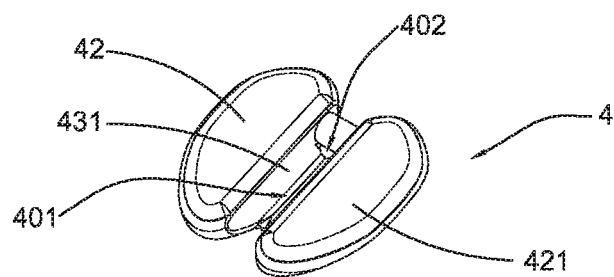
Figure 28B:
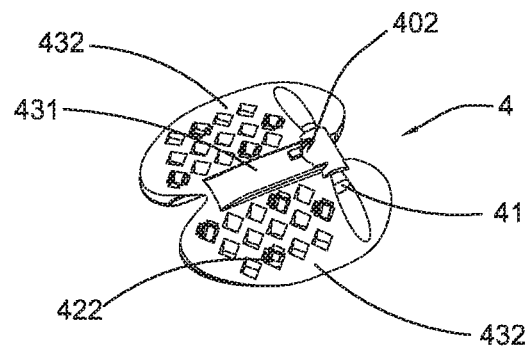

FIGS. 28A and 28B illustrate a saddle of the exemplary cycle of the foldable vehicle frame according to the above fourth preferred embodiment of the present invention.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

The following is disclosed in order that those skilled in the art can make and use the present invention. Preferred embodiments in the following descriptions are only to give obvious examples and modifications for those skilled in the art, which shall not limit the scope of the present invention. The basic notions of the present invention defined in the following descriptions can apply to other implementations, alternatives, modifications, and equivalences that do not deviate the scope or spirit of the present invention.

Figure 1:
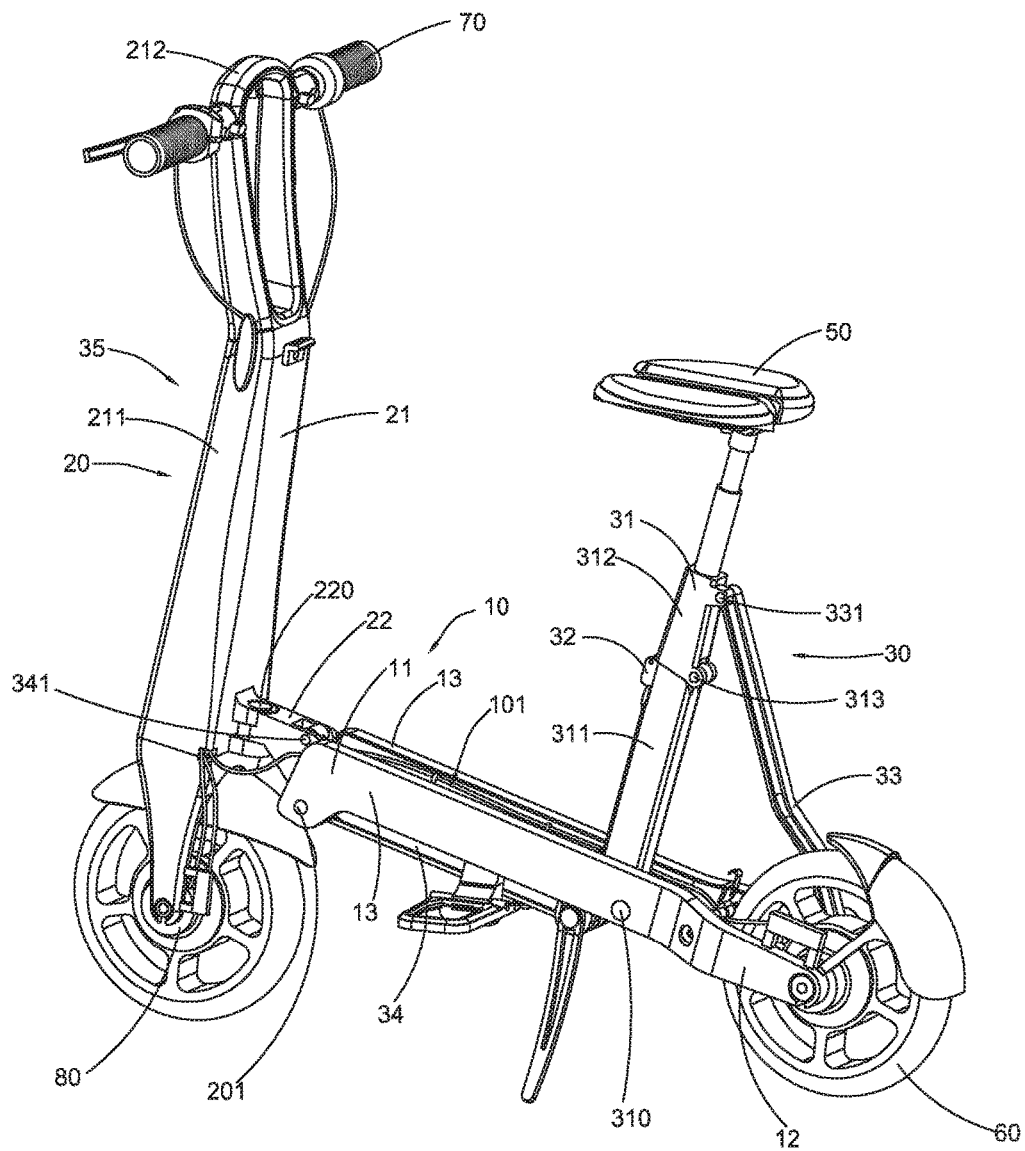
FIG. 1 is a 3D view of the foldable electric vehicle according to a first preferred embodiment of the present invention, wherein the foldable electric vehicle illustrated is in an unfolded state.
Figure 2:
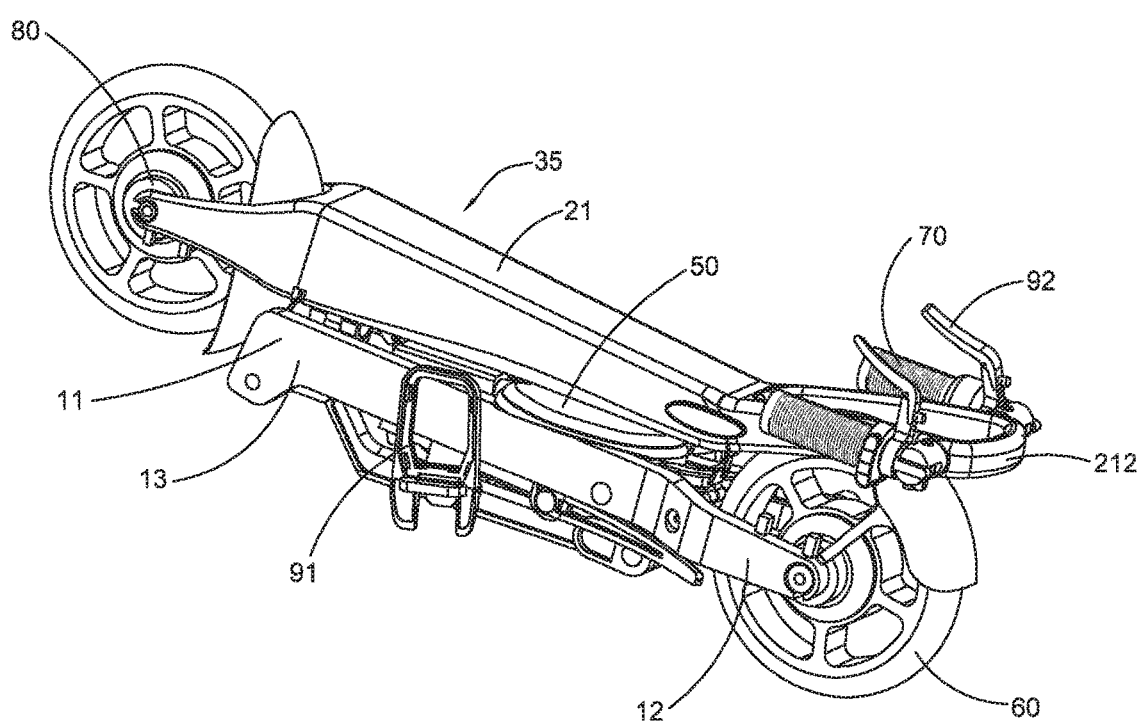
FIG. 2 is a 3D view of the foldable electric vehicle according to the above first preferred embodiment of the present invention, wherein the foldable electric vehicle illustrated is in a folded state.
Figure 3:
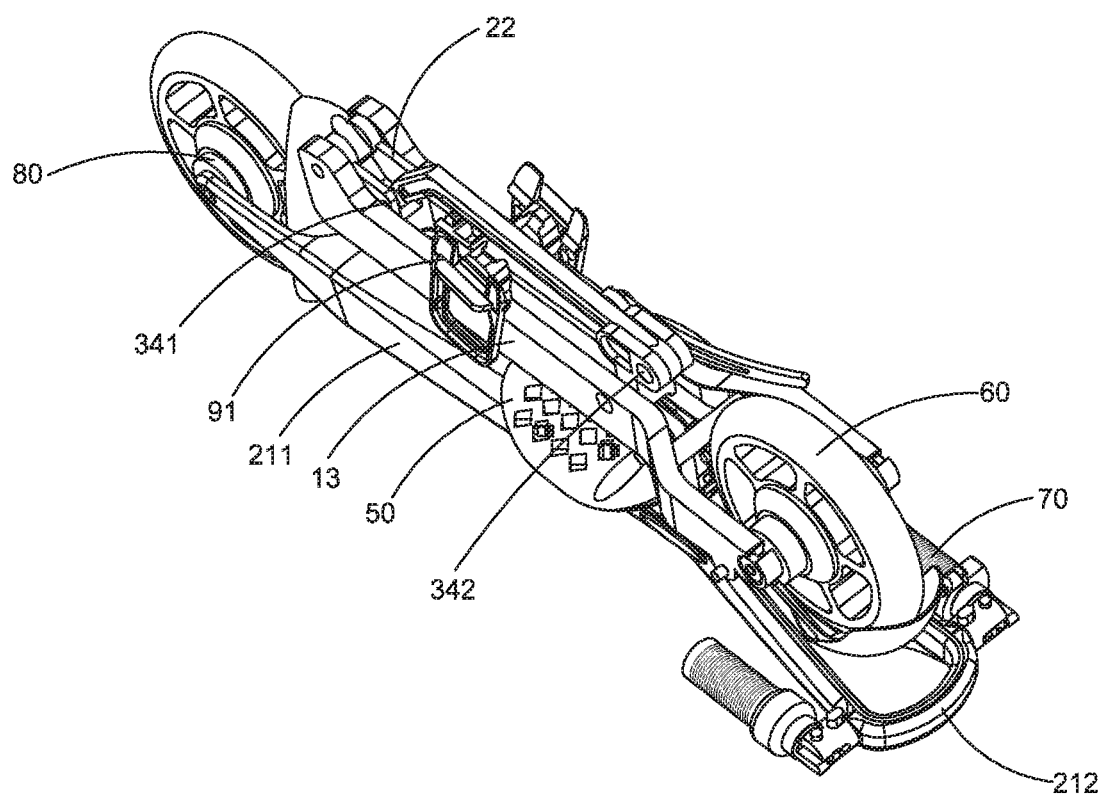
FIG. 3 is a 3D view of the foldable electric vehicle according to the above first preferred embodiment of the present invention, wherein the foldable electric vehicle illustrated is also in a folded state.
Figure 4:
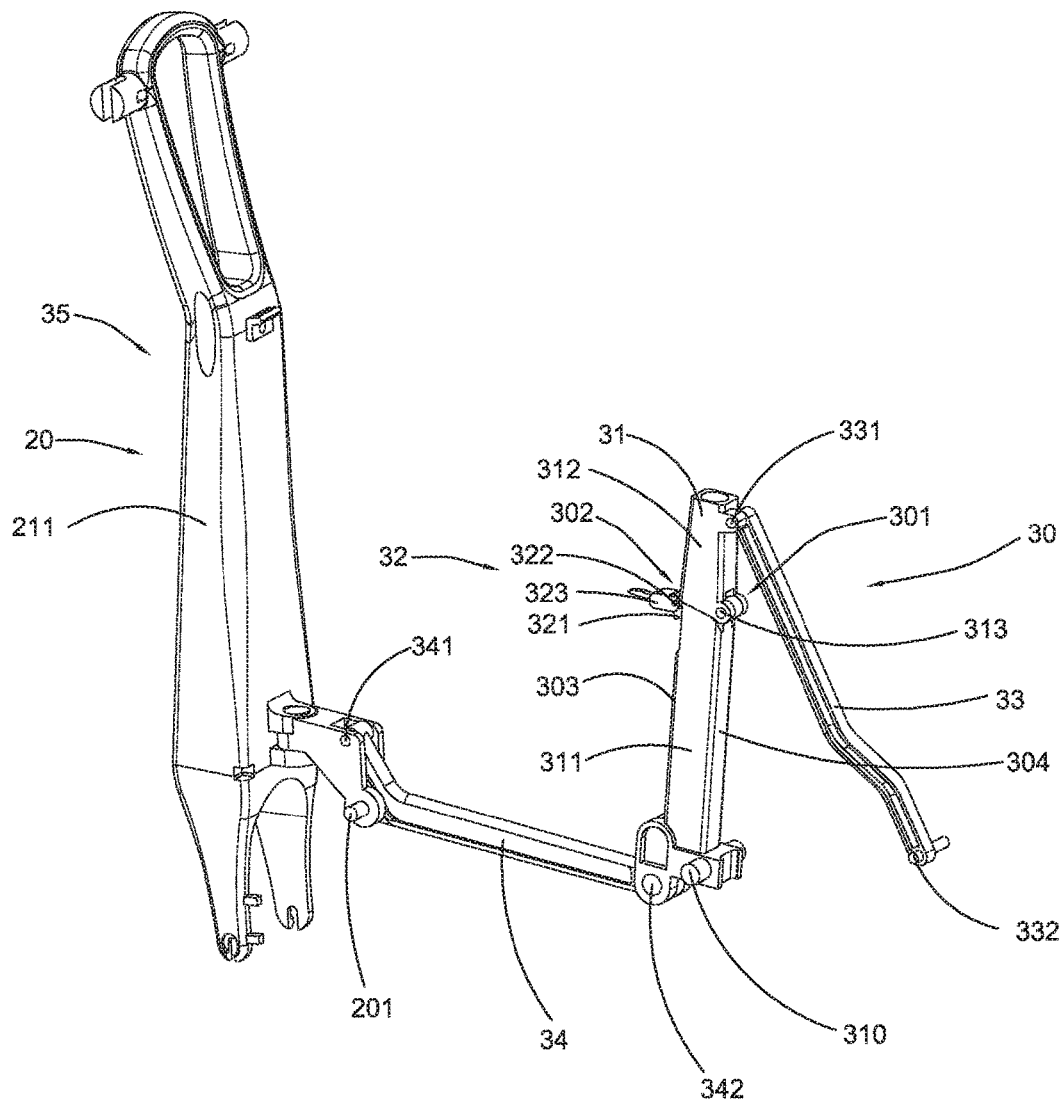
FIG. 4 is a 3D view of the vehicle frame of the foldable electric vehicle according to the above first preferred embodiment of the present invention, wherein the vehicle frame of the foldable electric vehicle illustrated is held upright.
Figure 5:
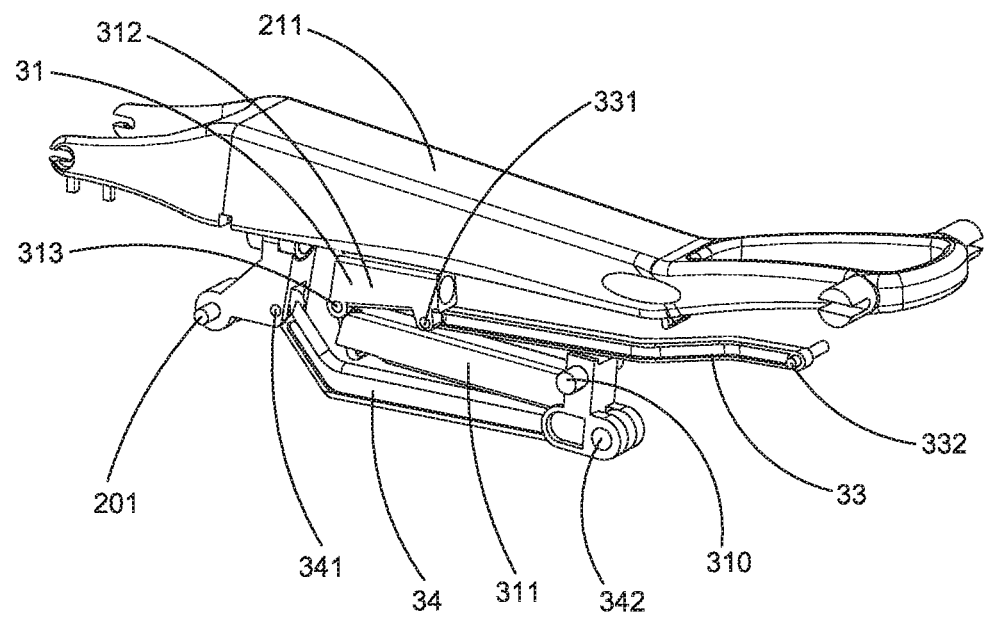
FIG. 5 is a 3D view of the vehicle frame of the foldable electric vehicle according to the above first preferred embodiment of the present invention, wherein the vehicle frame of the foldable electric vehicle illustrated is upright folded.
Figure 6:
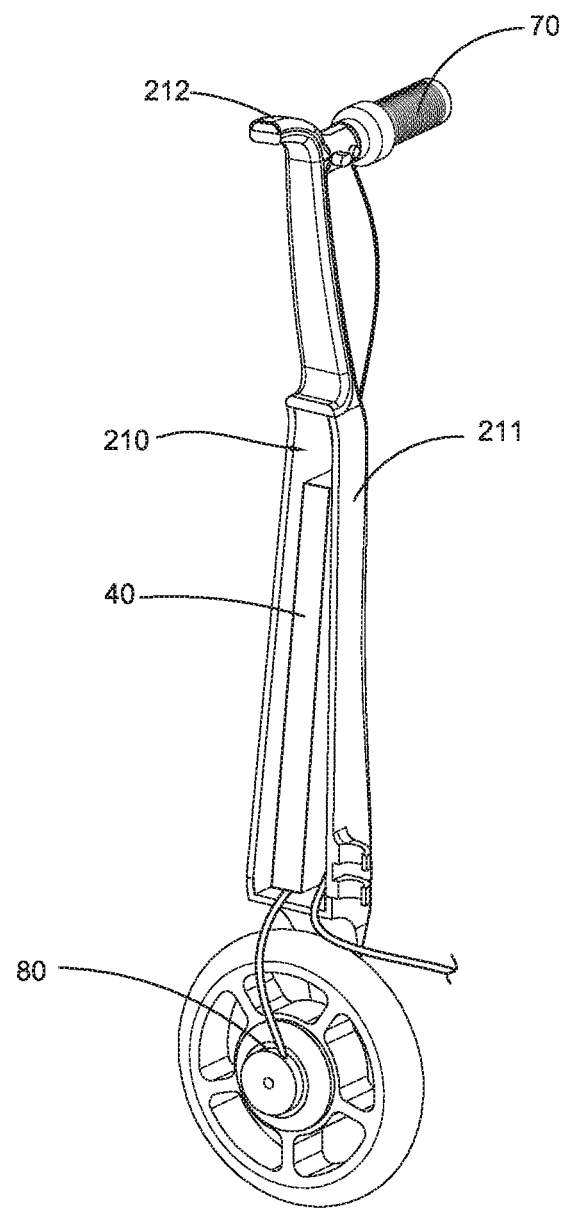
FIG. 6 is a sectional view of the foldable electric vehicle according to the above first preferred embodiment of the present invention, illustrating that the power unit of the foldable electric vehicle of the present invention is arranged in the front body of the foldable electric vehicle.
Figure 7:
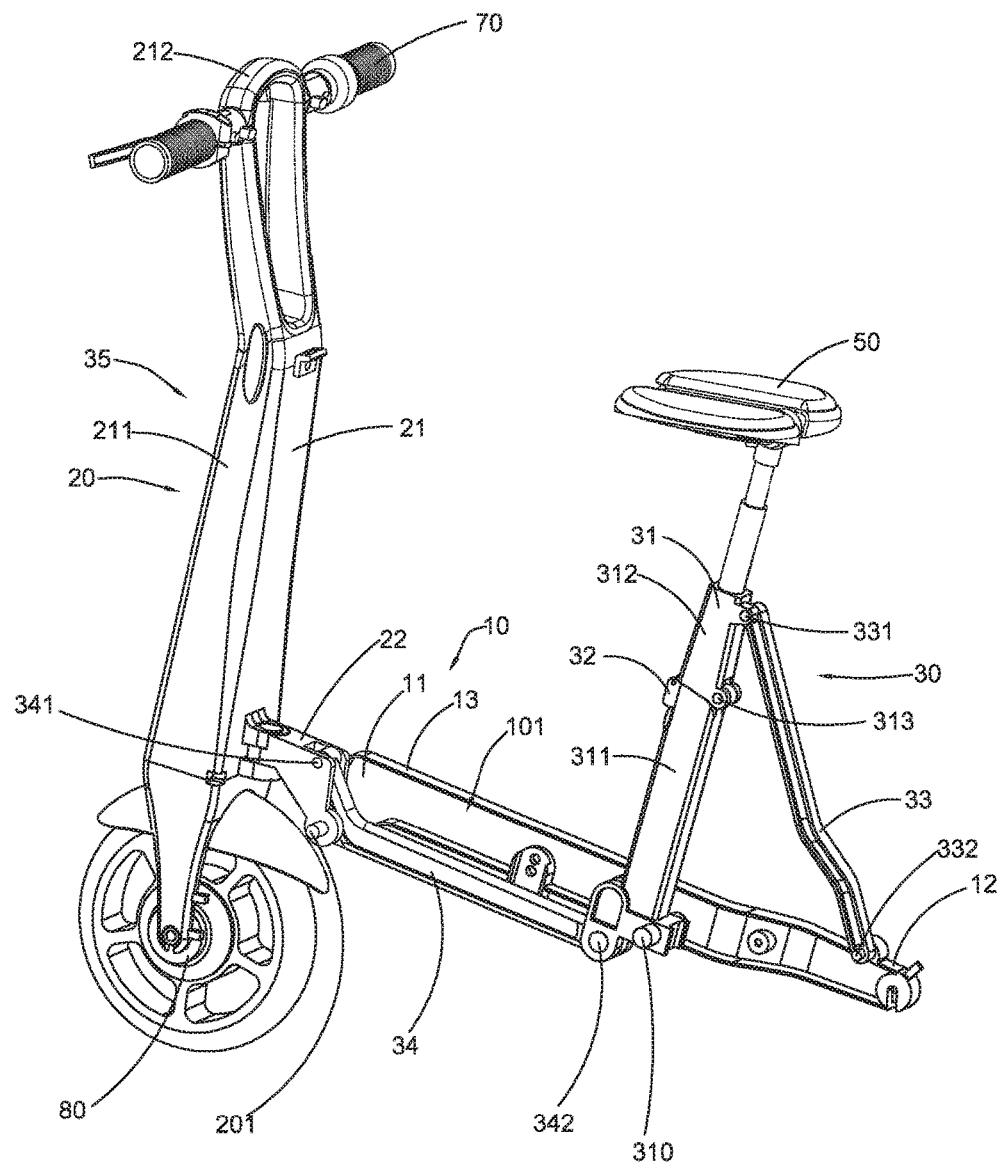
FIG. 7 is a partially sectional view of the foldable electric vehicle according to the above first preferred embodiment of the present invention, illustrating the supporting element of the vehicle frame of the foldable electric vehicle.

Referring to FIGS. 1-11 of the drawings, the foldable electric vehicle according to a first preferred embodiment of the present invention is illustrated. The foldable electric vehicle comprises a vehicle body 10, a front body 20 pivotally arranged on the vehicle body 10, a vehicle frame 30 arranged on the vehicle body 10, a power unit 40 arranged on the front body 20, a saddle 50 arranged on the vehicle frame 30, and a plurality of wheels 60, wherein the wheels 60 are respectively arranged on the vehicle body 10 and the front body 20. It is understandable that the foldable electric vehicle of the present invention further comprises two handles 70 or has the front body 20 form two handles 70, so as to help the user to ride it. Referring to FIGS. 1-3 of the drawings, the vehicle body 10 forms a front 11 and a rear 12. The front body 20 is pivotally arranged on the front 11 of the vehicle body 10, so that the front body 20 can be folded on the vehicle body 10.

Referring to FIGS. 1-3 of the drawings, the vehicle frame 30 comprises a back frame 31 pivotally arranged on the rear 12 of the vehicle body 10. The vehicle body 10 forms a receiving groove 101. The back frame 31 comprises a lower end 311 and an upper end 312 upwardly extended from the lower end 311. The lower end 311 of the back frame 31 is pivotally arranged on the upper end 312. A connecting pivot 313 formed by the upper end 312 and the lower end 311 is arranged toward the rear 12 of the vehicle body 10. The receiving groove 101 of the vehicle body 10 is arranged to be able to receive the back frame 31 of the vehicle frame 30, so that the back frame 31 of the vehicle frame 30 can be folded in the receiving groove 101 of the vehicle body 10. In other words, the upper end 312 is pivotally arranged on the lower end 311 through the connecting pivot 313. When the back frame 31 of the vehicle frame 30 is folded, the upper end 312 of the back frame 31 is folded on the lower end 311, and the folded back frame 31 is received in the receiving groove 101 of the vehicle body 10. It is understandable that the length of the receiving groove 101 of the vehicle body 10 is not shorter than the maximum length of the folded back frame 31.

Referring to FIG. 1 of the drawings, when the foldable electric vehicle according to the above first preferred embodiment of the present invention is in an unfolded state, the back frame 31 of the vehicle frame 30 of the foldable electric vehicle is remained unfolded, so as to support and hold the saddle 50 at a suitable (horizontal) position. Also, the front body 20 is unfolded and kept apart from the vehicle body 10, such that the electric vehicle can be rid and move. Referring to FIG. 2 of the drawings, when the foldable electric vehicle is in a folded state, the back frame 31 of the vehicle frame 30 of the foldable electric vehicle is folded and received in the receiving groove 101 of the vehicle body 10. The front body 20 is folded on the folded back frame 31. The saddle 50 is folded in the middle the front body 20 and the back frame 31 of the vehicle frame 30. It is understandable that when the foldable electric vehicle is in the unfolded state, the front body 20 and the back frame 30 are both held upright.

Referring to FIGS. 1-3 the drawings, the vehicle frame 30 further comprises a locking device 32 arranged on the back frame 31 of the vehicle frame 30. The locking device 32 comprises a first locking element 321 arranged on the lower end 311 of the back frame 31 of the vehicle frame 30, a second locking element 322 arranged on the upper end 312 of the back frame 31, and a locking catch 323. The locking catch 323 is arranged for unlockably locking the first locking element 321 and the second locking element 322 together, so as to, based on the user's needs, either keep the back frame 31 in the unfolded state in order to support the saddle 50 at a suitable position, or unlock the upper end 312 and the lower end 311 of the back frame 31 from each other, so that the back frame 31 can be folded and received in the receiving groove 101 of the vehicle body 10. In other words, the locking device 32 has a locked state and an unlocked state wherein when the locking device 32 is in the locked state, the lower end 311 and the upper end 312 of the back frame 31 are stably locked together, while when the locking device 32 is in the unlocked state, the upper end 312 of the back frame 31 can freely pivot relatively to the lower end 311. It is understandable that the locking device 32 can be any lock that unlockably locks the upper end 312 and the lower end 311 of the back frame 31 together. It is understandable that because the upper end 312 of the back frame 31 of the vehicle frame 30 is pivotally arranged on the lower end 311 and the locking device 32 is able to lock the upper end 312 on the lower end 311, the back frame 31 of the vehicle frame 30 forms a pin joint site 301 and a lock site 302, wherein the pin joint site 301 and the lock site 302 are both arranged between the upper end 312 and the lower end 311. Preferably, the back frame 31 forms an inner side 303 opposite to the front body 20 and an outer side 304. The pin joint site 301 of the vehicle frame 30 is arranged on the outer side 304 of the back frame 31, while the lock site 302 of the back frame 31 is arranged on the inner side 303 of the back frame 31. More preferably, the height of the position where the pin joint site 301 of the back frame 31 is at is higher than the height of the position where the lock site 302 of the back frame 31 is at.

Referring to FIGS. 1-3 of the drawings, the vehicle frame 30 further comprises a supporting element 33 arranged between the back frame 31 and the rear 12 of the vehicle body 10, wherein an end of the supporting element 33 is pivotally arranged on the upper end 312 of the back frame 31, while another end thereof is pivotally arranged on the rear 12 of the vehicle body 10, so that when the back frame 31 of the vehicle frame 30 is unfolded, the back frame 31 of the vehicle frame 30, the rear 12 of the vehicle body 10, and the supporting element 33 form a triangular structure, so as to provide a steady support for the saddle 50 (or the user sitting on the saddle 50). Preferably, when the back frame 31 of the vehicle frame 30 is unfolded, the included angle between the vehicle body 10 and the back frame 31 of the vehicle frame 30, the included angle between the back frame 31 of the vehicle frame 30 and the supporting element 33, and the included angle between the rear 12 of the vehicle body 10 and the supporting element 33 are all acute angle. It is understandable that during the folding process of the back frame 31 of the vehicle frame 30, the back frame 31 itself is folded, so that the upper end 312 of the back frame 31 is folded to the lower end 311 of the back frame 31. Then after the back frame 31 is folded, it will be further folded into the receiving groove 101 of the vehicle body 10. It is understandable that the supporting element 33 can be in any shape that is able to achieve the object(s) of the present invention. For example, the supporting element 33 can be rod shaped or band shaped.

Referring to FIGS. 1 to 3 of the drawings, an end of the supporting element 33 of the vehicle frame 30 is arranged on the upper end 312 of the back frame 31 of the vehicle frame 30. Another end of the back frame 31 is arranged in the receiving groove 101 of the vehicle body 10, so that when the back frame 31 is folded and received in the receiving groove 101 of the vehicle body 10, the supporting element 33 will be folded between the lower end 311 and the upper end 312 of the back frame 31.

Referring to FIGS. 1 to 3 of the drawings, the vehicle frame 30 of the foldable electric vehicle according to the above first preferred embodiment of the present invention further comprise an actuating arm 34. The actuating arm 34 is respectively pivotally arranged on the front body 20 and the lower end 311 of the back frame 31 of the vehicle frame 30. The front body 20 and the actuating arm 34 form a first pivot 341. The back frame 31 and the actuating arm 34 form a second pivot 342. The height of the position of the first pivot 341 is higher than the height of the position of the second pivot 342. Therefore, when the back frame 31 of the vehicle frame 30 itself is folded and folded to the vehicle body 10, the back frame 31 is able to utilize the actuating arm 34 to drive the front body 20 to fold toward the vehicle body 10. On the other hand, when the front body 20 is driven to fold to the vehicle body 10, the front body 20 is able to utilize the 4 actuating arm 34 to lead the back frame 31 of the vehicle frame 30 to fold and drive the back frame 31 to fold toward the vehicle body 10. In other words, the front body 20 according to the above first preferred embodiment of the present invention, is pivotally arranged on an end of the actuating arm 34 via the first pivot 341, wherein the back frame 30 of the vehicle frame 31 is pivotally arranged on another end of the actuating arm 34 via the second pivot 342, wherein the height of the position of the first pivot 341 is higher than the height of where the second pivot 342 is at.

Referring to FIGS. 1-3 of the drawings, further, the front body 20 and the front 11 of the vehicle body 10 form a third pivot 201, wherein the back frame 31 of the vehicle frame 30 and the rear 12 of the vehicle body 10 form a fourth pivot 310. When the foldable electric vehicle of the present invention is in the unfolded state, the height of the position of the first pivot 341 is higher than the height of the position of the third pivot 201, and the height of the position of the fourth pivot 310 is higher than the height of the position of the second pivot 342. In other words, the front body 20 pivotally arranged on the front 11 of the vehicle body 10 through the third pivot 201. The back frame 31 of the vehicle frame 30 is pivotally arranged on the rear 12 of the vehicle body 10 through the fourth pivot 310. It is understandable that the first pivot 341, the second pivot 342, the third pivot 201, and the fourth pivot 310 are all horizontally arranged.

Referring to FIGS. 1 and 2 of the drawings, the front body 20 of the foldable electric vehicle according to a first preferred embodiment of the present invention comprises a front holding body 21 and a first connecting element 22 arranged between the front holding body 21 and the front 11 of the vehicle body 10. An end of the first connecting element 22 is arranged on the front holding body 21, while another end thereof is arranged on the front 11 of the vehicle body 10 via the third pivot 201. The length from the third pivot 201 to the front holding body 21 of the front body 20 is L1. The length from the fourth pivot 310 to the second pivot 341 is L2. The L1 length is greater than the L2 length.

Referring to FIGS. 1-11 of the drawings, the vehicle body 10 of the foldable electric vehicle according to the above first preferred embodiment of the present invention comprises two plates 13 facing to each other, wherein the plates 13 form the receiving groove 101 therebetween. It is understandable that the structure formed with the two plate-type objects of the vehicle body 10 allows the receiving groove 101 to be as big as possible and allows the weight of the vehicle body 10 to be as light as possible. In order to reduce the weight of the vehicle body 10 and enhance the strength of the vehicle body 10 as possible, the vehicle body 10 can be made of high intensity and low density material, such as carbon fiber material, high intensity alloy (like aluminum magnesium alloy). It is understandable that according to the needs of the objects of the present invention, the plate 13 of the vehicle body 10 can have any shape that is able to achieve the object(s) of the present invention. The shape can be regular or irregular.

Referring to FIGS. 1-11 of the drawings, the shape and length of the supporting element 33 of the vehicle frame 30 of the foldable electric vehicle according to the above first preferred embodiment of the present invention is arranged according to the shape and length of the receiving groove 101 of the vehicle body 10, so that the supporting element 33 can be received in the receiving groove 101. Preferably, an end of the supporting element 33 of the vehicle frame 30 is arranged on the upper end 312 of the back frame 31 of the vehicle frame 30, while another end of the back frame 31 is arranged on an inner wall 131 of a plate 13 of the vehicle body 10.

Referring to FIGS. 1 and 2 of the drawings, an end of the first connecting element 22 of the front body 20 of the foldable electric vehicle according to the above first preferred embodiment of the present invention is pivotally arranged between two plates 13 of the vehicle body 10, such that the first connecting element 22 can pivot in a vertical direction relative to the plates 13. Another end of the first connecting element 22 is pivotally arranged on the front holding body 21 that is arranged to be able to pivot in a horizontal direction relative to the first connecting element, such that the front body 20 can pivot in the horizontal direction relative to the first connecting element 22. Therefore, the electric vehicle of the present invention can change direction based on the riding conditions during the riding process. In other words, the front holding body 21 is pivotally arranged on the first connecting element 22 through a vertical hinge 220, so that the front holding body 21 of the front body 20 can utilize the first connecting element 22 to pivot in the horizontal direction, as illustrated in FIGS. 1 and 2 of the drawings.

Referring to FIGS. 1-9 of the drawings, the saddle 50 of the foldable electric vehicle according to a first preferred embodiment of the present invention forms an open slot 501. The saddle 50 is pivotally arranged on the back frame 31 of the vehicle frame 30, so as to allow the saddle 50 to be pivoted to a supporting position and a folding position. When the saddle 50 is pivoted to the supporting position, the saddle 50 will be supported by the upper end 311 of the back frame 31 and held horizontally for the user to sit thereon. When the saddle 50 is pivoted to the folding position, the saddle 50 will be folded at the back frame 31 of the vehicle frame 30. The saddle 50 then utilizes the open slot 501 to engage with the upper end 311 of the back frame 31. As a result, when the back frame 30 is folded on the vehicle body 10, the saddle 50 can be away from supporting the front body 20 and therefore, the size of the folded electric vehicle can become as small as possible.

Figure 8:
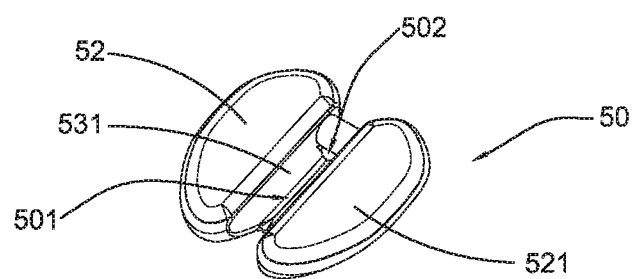
FIG. 8 is a 3D view of the saddle of the foldable electric vehicle according to the above first preferred embodiment of the present invention.
Figure 9:
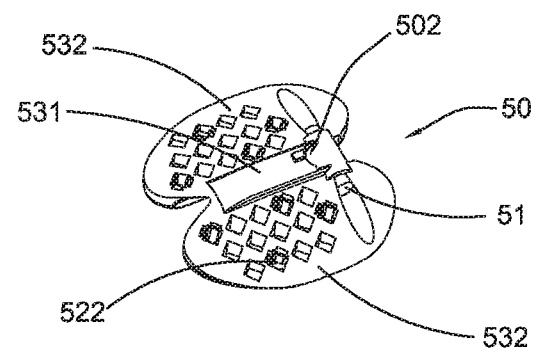
FIG. 9 is a bottom view of the saddle of the foldable electric vehicle according to the above first preferred embodiment of the present invention.
Figure 10:
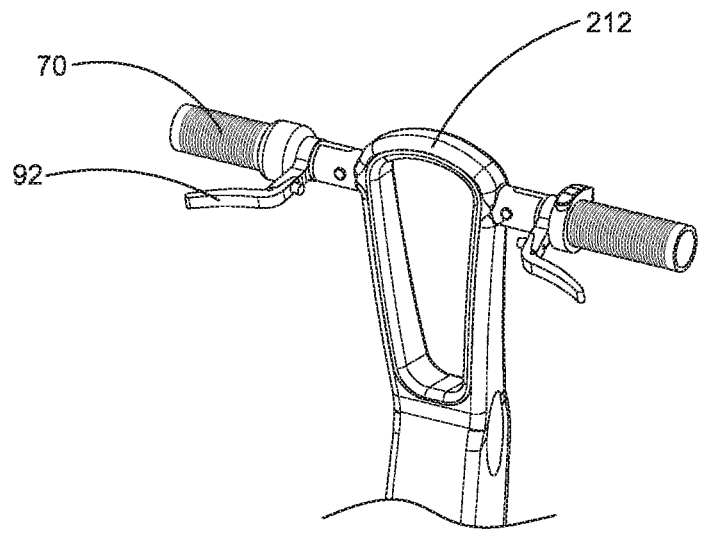
FIG. 10 is a 3D view of the handle of the foldable electric vehicle according to the above first preferred embodiment of the present invention.
Figure 11:
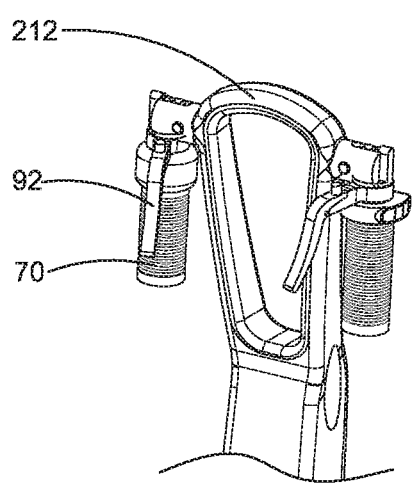
FIG. 11 is a 3D view of the handle of the foldable electric vehicle according to the above first preferred embodiment of the present invention.

Referring to FIGS. 8 and 9 of the drawings, the saddle 50 comprises a pivoting end 51, two supporting parts 52 respectively extended from the pivoting end 51, and a holding element 53. The open slot 501 of the saddle 50 forms between the two supporting parts 52. The pivoting end 51 of the saddle 50 and the holding element 53 form a pivot hole 502 therebetween extended between the two supporting parts 52 with the holding element 53, so that when the saddle 50 is pivoted to the supporting position, the saddle 50 will be supported by the upper end 311 of the back frame 31 and held horizontally, while when the saddle 50 is pivoted to the folding position, the saddle 50 will be folded at the back frame 31 of the vehicle frame 30 and engaged with the upper end 311 of the back frame 31 with the open slot 501.

It is worth noted that the saddle 50 is supported by the back frame 31 of the vehicle frame 30 through the holding element 53 thereof and uses the supporting part 52 thereof to support the user thereabove. Therefore, the holding element 53 of the saddle 50 is made of high strength material. Preferably, the holding element 53 is made of high strength plastic material, so as to have advantages like light weight, and easy to be formed and processed.

Referring to FIGS. 8 and 9 of the drawings, the holding element 53 of the saddle 50 forms a holding part 531 and two edge parts 532 respectively outwardly extended from the holding part 531. The supporting parts 52 and the holding part 531 of the holding element 53 form the open slot 501. The supporting parts 52 are respectively arranged on the edge parts 532 of the holding element 53. Preferably, the open slot 501 has a curvy profile. It is understandable that the supporting parts 52 respectively form a cushion layer 521 for the user to sit thereon. In addition, the supporting part 521 further forms a fastening layer 522 that is secured on the edge part 532 of the holding part 531.

Referring to FIGS. 1-11 of the drawings, the front holding body 21 of the front body 20 of the foldable electric vehicle according to the above first preferred embodiment of the present invention forms a casing 211. The casing 211 forms a receiving chamber 210 to receive the power unit 40 and the driving mechanism 80 of the electric vehicle of the present invention. The driving mechanism 80 is connected with the wheel 60, so as to drive the wheel 60 to rotate and drive the electric vehicle. It is understandable that the driving mechanism 80 refers to any electric driving mechanism that is able to electronically connected with the power unit 40 and utilize the power or electrical energy provided by the power unit 40 to drive at least a wheel 60 of the foldable electric vehicle of the present invention to rotate, so as to drive the foldable electric vehicle to move. Preferably, the driving mechanism 80 is a driving motor that is able to drive the wheel 60 of the foldable electric vehicle to rotate. More preferably, the driving mechanism 80 is a hub motor that can be directly placed in the wheel 60 of the foldable electric vehicle. Referring to FIGS. 1-11 of the drawings, the front holding body 21 of the front body 20 of the foldable electric vehicle according to the above first preferred embodiment of the present invention further forms a griping portion 212 for the user to grasp and drag the electric vehicle. Preferably, the handles 70 of the electric vehicle of the present invention are respectively arranged on the two sides of the front holding body 21 of the front body 20. More preferably, the handles 70 of the electric vehicle of the present invention are respectively arranged on the two sides of the griping portion 212 of the front body 20.

Referring to FIGS. 1-11 of the drawings, the foldable electric vehicle according to the above first preferred embodiment of the present invention further comprises attachments 90. The attachments 90 may comprise two footrests 91 that are respectively arranged on the vehicle body 10, two brakes 92 that are respectively arranged on the front body 20 and the rear 12 of the vehicle body 10, and electric wires that are respectively electronically arranged between the power unit 40 and the driving mechanism 80.

Referring to FIGS. 1-11 of the drawings, the present invention further provides a foldable vehicle frame 30 for electric vehicle, which makes the electric vehicle occupy as smaller volume as possible when it is placed aside. The electric vehicle comprises a vehicle body 10 and a front body 20. The foldable vehicle frame 30 comprises a back frame 31 that can be pivotally arranged on the vehicle body 10, a locking device 32, a supporting element 33, and an actuating arm 34. The back frame 30 comprises a lower end 311 pivotally arranged on the vehicle body 10 and an upper end 312 pivotally arranged on the lower end 311. The locking device 32 is arranged to unlockably lock the lower end 311 and the upper end 312 together. An end of the supporting element 33 is pivotally arranged on the upper end 312 of the back frame 31, while another end thereof is pivotally arranged on the vehicle body 10. The actuating arm 34 is respectively pivotally arranged on the lower end 311 of the back frame 31 and the front body 20. Referring to FIGS. 1 and 2 of the drawings, the back frame 31 of the vehicle frame 30 and the vehicle body 10 form a fourth pivot 310, while the back frame 31 and the actuating arm 34 form a second pivot 341. More preferably, the height of the position where the fourth pivot 310 is at is higher than the height of the position where the second pivot 341 is at. More preferably, the back frame 31 of the vehicle frame 30, the supporting element 33, and the vehicle body 10 form a acute triangle. It is understandable that the locking device 32 can be any lock that unlockably locks the upper end 312 and the lower end 311 of the back frame 31 together.

Referring to FIGS. 1-11 of the drawings, the foldable vehicle frame 30 for electric vehicle according to the present invention can be seen as further comprising a front frame 35. The front frame 35 is formed by the front body 20 or it is even considered the front body 20 as the front frame 35.

Figure 12:
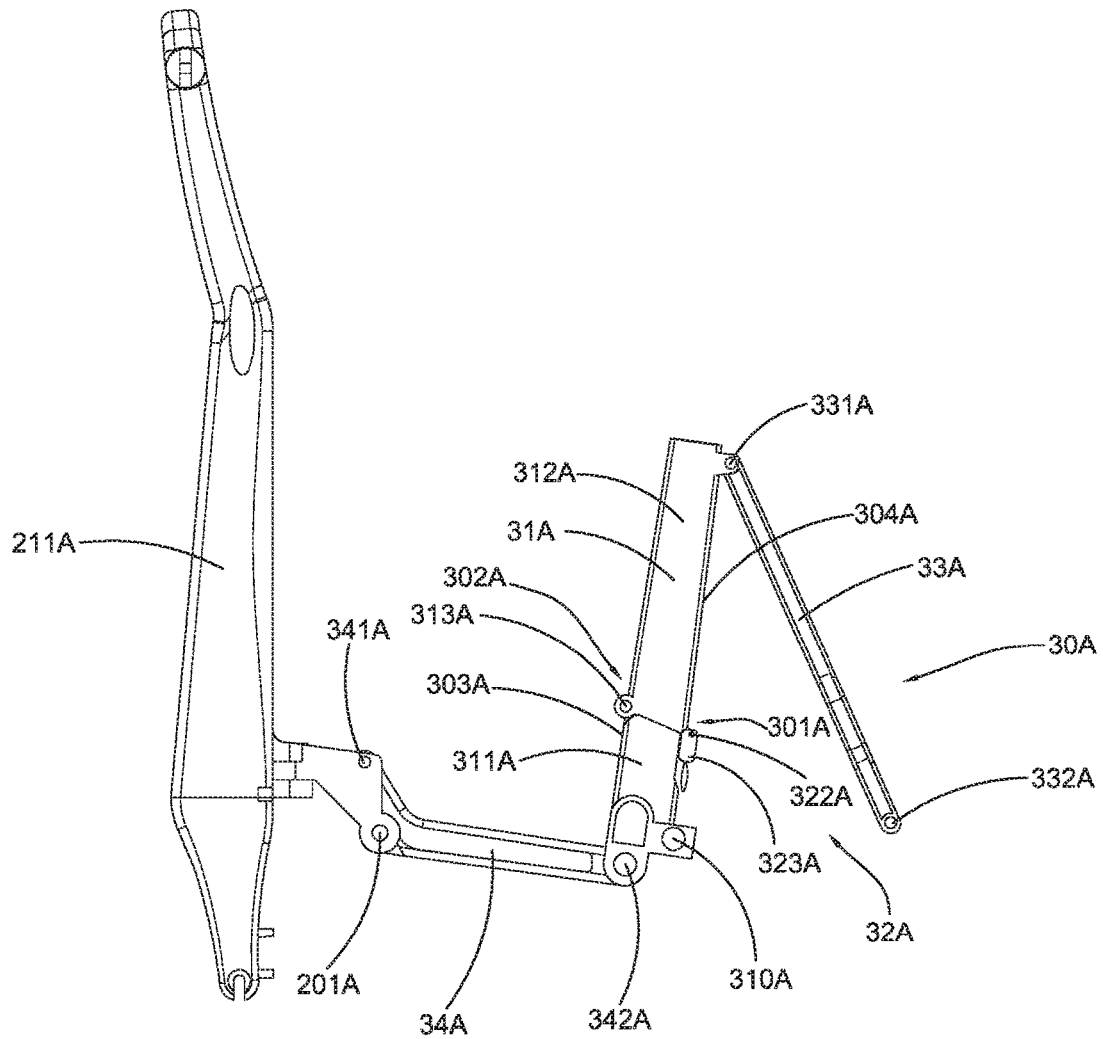
FIG. 12 refers to an alternative of the back frame of the vehicle frame of the foldable electric vehicle according to the above first preferred embodiment of the present invention, wherein the vehicle frame of the foldable electric vehicle illustrated is in an unfolded state.
Figure 13:
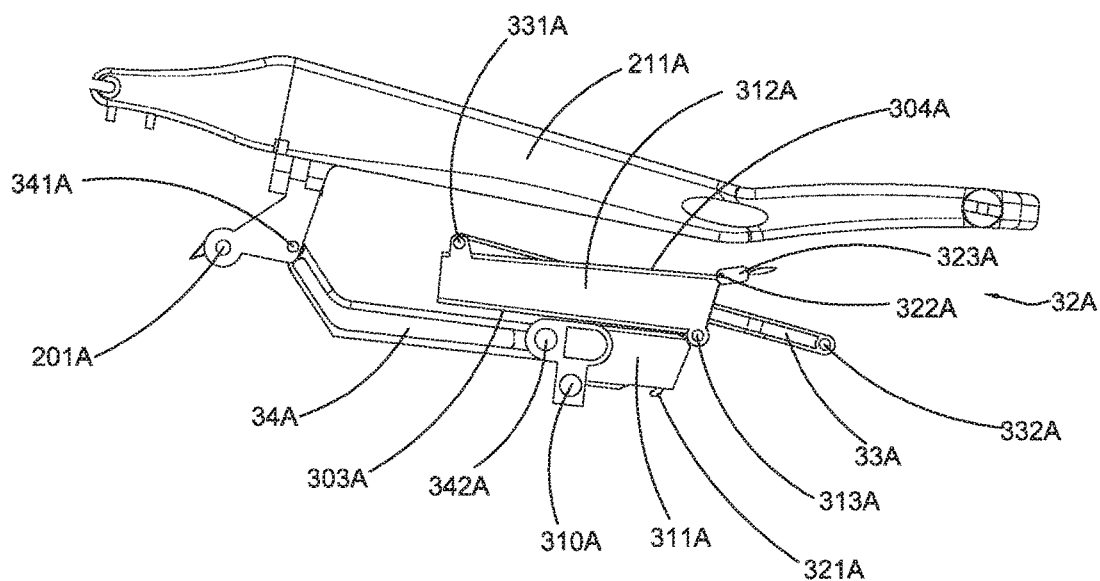
FIG. 13 refers to the alternative of the back frame of the vehicle frame of the foldable electric vehicle according to the above first preferred embodiment of the present invention, wherein the vehicle frame of the foldable electric vehicle illustrated is in a folded state.

Referring to FIGS. 12 and 13 of the drawings, an alternative of the vehicle frame 30 of the foldable electric vehicle according to the above first preferred embodiment of the present invention is illustrated, wherein the vehicle frame 30A comprises a back frame 31A that can be pivotally arranged on the vehicle body 10, a locking device 32A, a supporting element 33A, and an actuating arm 34A. The back frame 30A comprises a lower end 311A pivotally arranged on the vehicle body 10 and an upper end 312A pivotally arranged on the lower end 311A. The locking device 32A is arranged to unlockably lock the lower end 311A and the upper end 312A together. An end of the supporting element 33A is pivotally arranged on the upper end 312A of the back frame 31A, while another end thereof is pivotally arranged on the vehicle body 10. The actuating arm 34A is respectively pivotally arranged on the lower end 311A of the back frame 31A and the front body 20. Preferably, the back frame 31 of the vehicle frame 30, the supporting element 33, and the vehicle body 10 form a obtuse triangle.

Referring to FIGS. 12 and 13 of the drawings, the back frame 31A of the vehicle frame 30A and the vehicle body 10 form a fourth pivot 310A, while the back frame 31A and the actuating arm 34A form a second pivot 342A, wherein the height of the position where the second pivot 342A is at is higher than the height of the position where the fourth pivot 310A is at. It is understandable that because the upper end 312A of the back frame 31A of the vehicle frame 30A is pivotally arranged on the lower end 311A and the locking device 32A is able to lock the upper end 312A on the lower end 311A, the back frame 31A of the vehicle frame 30A forms a pin joint site 301A and a lock site 302A, wherein the pin joint site 301A and the lock site 302A are both arranged between the upper end 312A and the lower end 311A. Preferably, the back frame 31A forms an inner side 303A opposite to the front body 20A and an outer side 304A. The pin joint site 301A of the vehicle frame 30A is arranged on the inner side 303A of the back frame 31A, while the lock site 302A of the back frame 31 is arranged on the outer side 304A of the back frame 31A. More preferably, the height of the position where the pin joint site 301A of the back frame 31A is at is higher than the height of the position where the lock site 302A of the back frame 31A is at.

Referring to FIGS. 14 and 15 of the drawings, a technical solution of the draw cord quick unlocking and folding mechanism according to a second preferred embodiment of the present invention is as following.

It comprises a upper pole 1, a lower pole 2, a main spindle of folding pole 3, a first spindle 4, a quick release handle 5, a propping spring 6, a second spindle 7, a prop 8, a torsion spring 9, and a third spindle 10, wherein the upper pole 1 and the lower pole 2 are connected via the main spindle of folding pole 3, wherein a side of a lower part of the upper pole 1 is connected with the quick release handle 5 via the first spindle 4, wherein the quick release handle 5 is connected with the prop 8 in the inside thereof via the second spindle 7, wherein a side of the prop 8 and a propping block 15 on the inner wall of the quick release handle 5 has a propping spring 6 therebetween, wherein an upper part of the prop 8 couples with a lug 14 of the top of the lower pole 2. It further comprises a security block 11, a fourth spindle 12, and a draw cord 13, wherein the lower part of the prop 8 has a security block 11 connected thereto via the third spindle 10, wherein an end of the security block 11 has a torsion spring 9, while a lower part of another end of the security block 11 is connected with a draw cord 13 via the fourth spindle 12, wherein a catch 16 on the security block 11 couples with a catch groove 17 on the side wall of the quick release handle 5, wherein the quick release handle 5 has a unlocking notch 18 on the side wall thereof, wherein the unlocking notch 18 and the catch groove 17 are integral structure.

The operation steps of the draw cord quick unlocking and folding mechanism according to the above second preferred embodiment of the present invention are as follows.

First, when the catch 16 of the security block 11 couples with the catch groove 17 on the quick release handle 5, the prop 8 props the lug 14 on the lower pole 2 rendering the whole in a locking condition that cannot be opened by pulling the quick release handle 5 directly as long as the draw cord 13 is not drawn.

Second, when unlocking is required, the draw cord 3 can be drawn to bring the security block 11 to rotate around the third spindle 10, so the catch 16 on the security block 11 can enter the unlocking notch 18. As the security block 11 unlocks, the prop 8 will be loosened.

Third, when the draw cord 13 is further drawn, the quick release handle 5 can be pulled open. In other words, drawing the draw cord 13 can complete the unlock process and pull open the quick release handle 5 in one step, which saves the unlock process.

The advantages of the present embodiment, by applying the above structure, comprises that the new draw cord quick unlocking and folding mechanism according to the present embodiment can use the draw cord mechanism to complete both the unlocking and opening processes in one step, which saves the unlocking process, lowers the overall weight, helps the user to store and manage the device, enhances its practicability, simplifies its structure, makes its design sensible, reduces its costs, etc.

Referring to FIGS. 16 and 17 of the drawings, a technical solution of the bike saddle according to a third preferred embodiment of the present invention is as following.

It comprises a seat post 1, a saddle body 2, a cavity 3, a unlock button 4, and a latch 5. The saddle body 2 arranged above the seat post 1. The seat post 1 a shock proof seat post that has damping spring therein, so as to make the ridding process more comfortable. The saddle body 2 has two pieces respectively on the right side and left side that have a cavity 3 therebetween. The cavity 3 applies a sunken design that the surface of the cavity 3 is below the plane level of the saddle body 2, such that it can keep the prostate and reproductive organ of the rider from contacting the seat during the riding, which protects the reproductive health and provides cushioning effect to the saddle body 2. The unlock button 4 is at the bottom of the cavity 3. The rear area of the cavity 3 utilizes a latch 5 to connect the seat post 1. The cavity 3 uses honeycomb type of structural design, which not only enhances the strength thereof, but also increases the flexibility and greatly raises the comfort level of the seat.

Steps of using the present invention comprising backwardly locking the unlock button 4, fixing the saddle body 2 and the seat post 1, forwardly turning the unlock button 4 so the saddle body 2 can be unlocked from the seat post 1, revolving the saddle body 2 around the seat post 1 along the latch 5, backwardly flipping the saddle body 2 onto the seat post 1 so as to make the seat post 1 fall into the cavity 3 and reduce the storage volume.

The structure of the bike saddle according to the above third preferred embodiment of the present invention is simple, rationally designed, and easy to use. The bike saddle can be backwardly or forwardly inverted, so as to reduce the storage volume and make transport and carrying easier. Besides, it raises the comfort level of ridding and protects reproductive health.

Referring to FIGS. 18-21 of the drawings, the foldable cycle frame for cycle according to a fourth preferred embodiment of the present invention is illustrated, wherein the foldable cycle frame of the present invention 3 comprises a front frame 10B, a back frame 20B, and an actuating arm 30B arranged between the front frame 10B and the back frame 20B. The actuating arm 30B forms a front end 31B and a rear end 32B. The front frame 10B is pivotally arranged on the front end 31B of the actuating arm 30B, while the back frame 20B is pivotally arranged on the rear end 32B of the actuating arm 30B. Preferably, the front end 31B of the actuating arm 30B and the front frame 10B foldable cycle frame 3 of the present invention form a first pivot 310B, while the back frame and the rear end 32B of the actuating arm 30B form a second pivot 320B. The first pivot 310B and the second pivot 320B are respectively horizontally arranged, so that the front frame 10B and the back frame 20B are respectively pivotable in the vertical direction relatively to the actuating arm 30B. In other words, the foldable cycle frame of the present invention further comprises a first pivot 310B and a second pivot 320B. The first pivot 310B is arranged between the front frame 10B and the front end 31B of the actuating arm 30B, while the second pivot is arranged between the back frame 20B and the rear end 32B of the actuating arm 30B, so as to allow the front frame to utilize the first pivot 310B to be pivotally connected with the front end 31B of the actuating arm 30B, and allow the back frame to utilize the second pivot 320B to be pivotally connected with the rear end 32B of the actuating arm 30B.

Referring to FIG. 18 of the drawings, the front frame 10B of the foldable cycle frame for cycle according to the above fourth preferred embodiment of the present invention comprises a front frame body 11B and a first connecting element 12B pivotally arranged on the front end 31B of the actuating arm 30B. The front frame body 11B of the front frame 10B is pivotally arranged on the first connecting element 12B of the front frame 10B to form a third pivot 120B with the front frame body 11B and the first connecting element 12B. The third pivot 120B is set upright, so as to allow the front frame 10B to freely pivot within a designated angle in a horizontal direction. In other words, the front frame 10B of the foldable cycle frame 3 of the present invention further comprises a third pivot 120B. The first connecting element 12B is pivotally connected with the rear end 32B of the actuating arm 30B through the first pivot 310B. The third pivot 120B is arranged between the front frame body 11B of the front frame 10B and the first connecting element 12B, so that the front frame body 11B of the front frame 10B can be pivotally connected with the first connecting element through the third pivot 120B. Preferably, the third pivot 120B is arranged upright.

Referring to FIG. 18 of the drawings, when the foldable cycle frame for cycle according to the above fourth preferred embodiment of the present invention is in an unfolded state, the heights of the positions of the front frame 10B and the first pivot 310B of the front end 31B of the actuating arm 30B are respectively higher than the heights of the positions of the back frame 20B and the second pivot 320B of the rear end 32B of the actuating arm 30B, so as to allow the actuating arm 30B is able to draw the front frame body 11B of the front frame 10B and/or to drive the back frame 20B to move or fold toward the direction of the actuating arm 30B.

Referring to FIG. 18 of the drawings, the back frame of the foldable cycle frame for cycle according to the above fourth preferred embodiment of the present invention comprises a back frame body 21B. The back frame body 21B of the back frame 20B comprises a lower end 211B and an upper end 212B upwardly extended from the lower end 211B. The lower end 211B of the back frame body 21B of the back frame 20B is pivotally arranged on the rear end 32B of the actuating arm 30B through the second pivot 320B.

Referring to FIGS. 18 and 19 of the drawings, furthermore, the upper end 212B of the back frame 20B is pivotally arranged on the lower end 211B. The upper end 212B and the lower end 211B of the back frame body 21B form a connecting pivot 210B. The back frame body 21B has a inner side 213B facing toward the front frame 10B and a outer side 214B on the contrary. The connecting pivot 210B is horizontally arranged on the outer side 214B of the back frame body 21B, so that when the back frame 20B is folded, the lower end 211B of the back frame body 21B of the back frame 20B can be driven to pivot toward the direction of the actuating arm 30B and that the upper end 212B of the back frame body 21B can be folded on the lower end 211B of the back frame body 21B. In other words, the back frame 20B of the foldable cycle frame 3 according to the present invention further comprises a connecting pivot 210B. The connecting pivot 210B is arranged between the upper end 212B and the lower end 211B of the back frame body 21B so as to allow the upper end 212B of the back frame body 21B to be pivotally connected with the lower end 211B of the back frame body 21B through the connecting pivot 210B. Preferably, the connecting pivot 210B is arranged horizontally.

It is understandable that the back frame body 21B of the back frame 20B of the foldable cycle frame 3 of the present invention can be in any shape that is able to achieve the object(s) of the present invention. In some embodiments, the back frame body 21B of the back frame 20B of the foldable cycle frame 3 of the present invention is columnar, such as square column or circular column shaped. In another some embodiments, the back frame body 21B of the back frame 20B of the foldable cycle frame 3 of the present invention is tubular, such as square tube or circular pipe shaped. Preferably, the upper end 212B and the lower end 211B of the back frame body 21B of the back frame 20B of the foldable cycle frame 3 of the present invention are both square column or square tube, so that is easier for them to form the connecting pivot 210B.

Referring to FIGS. 18-21 of the drawings, the back frame 20B of the foldable cycle frame 3 for cycle according to a fourth preferred embodiment of the present invention further comprise a locking device 22B arranged on the inner side 213B of the back frame body 21B. The locking device 22B has a locked state and a unlocked state. When the locking device 22B is in the locked state, the lower end 211B and the upper end 212B of the back frame body 21B are stably locked together, while when the locking device 22B is in the unlocked state, the upper end 212B of the back frame body 21B can freely pivot relatively to the lower end 211B.

Referring to FIGS. 18-21, the locking device 22B of the back frame 20B of the foldable cycle frame for cycle according to the above fourth preferred embodiment of the present invention comprises a first locking element 221B arranged on the lower end 211B of the back frame body 21B of the back frame 20B, a second locking element 222B arranged on the upper end 212B of the back frame body 21B of the back frame 20B, and a locking catch 223B. The locking catch 223B is arranged to be able to unlockably lock the first locking element 221B and the second locking element 222B together, so as to, based on the user's needs, either keep the back frame body 21B of the back frame 20B in an unfolded state in order to keep the cycle in the workable mode and to provide a steady support for the user, or unlock the upper end 212B and the lower end 211B of the back frame body 21B of the back frame 20B, so that the back frame 20B can be folded. It is understandable that the locking device 22B can be any locking structure that unlockably locks the upper end 212B and the lower end 211B of the back frame body 21B of the back frame 20B together. It is understandable that because the upper end 212B of the back frame body 21B of the back frame 20B is pivotally arranged on the lower end 211B and the locking device 22B is able lock the upper end 212B on the lower end 211B, the back frame body 21B of the back frame 20B forms a pin joint site 2101B and a locked site 2102B, wherein the pin joint site 2101B and the locked site 2102B are both arranged between the upper end 212B and the lower end 211B, wherein the pin joint site 2101B of the back frame body 21B of the back frame 20B is arranged on the outer side 214B of the back frame body 21B of the back frame 20B, while the locked site 2102B of the back frame body 21B of the back frame 20B is arranged on the inner side 213B of the back frame body 21B of the back frame 20B. More preferably, the height of the position where the pin joint site 2101B of the back frame body 21B of the back frame 20B is at is higher than the height of the position where the locked site 2102B of the back frame body 21B of the back frame 20B is at.

Referring to FIGS. 18-27, the foldable cycle frame for cycle according to the above fourth preferred embodiment of the present invention further comprises a supporting element 40B. An end of the supporting element 40B is pivotally arranged on the upper end 212B of the back frame body 21B of the back frame 20B. The other end thereof is pivotally arranged on the cycle body 2 of the cycle 1. When the foldable cycle frame 3 of the present invention is unfolded or deployed, the supporting element 40B will be arranged to form a triangular structure with the back frame body 21B of the back frame 20B and the cycle body 2 of the cycle 1, so as to provide a steady support for the saddle 4 of the upper end 212B of the back frame body 21B of the back frame 20B. Preferably, when the foldable cycle frame 3 of the present invention is unfolded, the included angle between the cycle body 2 and the back frame body 21B of the back frame 20B, the included angle between the back frame body 21B of the back frame 20B and the supporting element 40B, and the included angle between the cycle body 2 and the supporting element 40B are all acute angle. In other words, the triangle formed by the supporting element 40B, the back frame body 21B of the back frame 20B, and the cycle body 2 of the cycle 1 is an acute angle. It is understandable that because the two ends of the supporting element 40B are respectively pivotally arranged on the upper end 212B of the back frame body 21B of the back frame 20B and the cycle body 2 of the cycle 1, when the upper end 212B of the back frame body 21B of the back frame 20B is folded to the lower end 211B of the back frame body 21B of the back frame 20B, the supporting element 40B will also be folded. Referring to FIGS. 18 and 19, the two ends 411B and 412B of the supporting element 40B are respectively connected with the back frame body 21B of the back frame 20B and the cycle body 2 of the cycle 1.

Referring to FIGS. 18-21, the first connecting element 12B of the front frame 10B of the foldable cycle frame for cycle according to the above fourth preferred embodiment of the present invention forms a first pivoting portion 121B. The lower end 211B of the back frame body 21B of the back frame 20B forms a second pivoting portion 2111B. The first pivoting portion 121B and the second pivoting portion 2111B are arranged to be respectively adapted for being pivotally arranged on the cycle body 2 of the cycle 1. Preferably, the length from the first pivoting portion 121B to the front frame body 11B of the front frame 10B is L1, while the length from the second pivoting portion 2111B to the second pivot 320B is L2. The L1 length is greater than the L2 length. Referring to FIGS. 18-21, preferably, the first pivoting portion 121B is arranged above the position of the first pivot 310B, while the second pivoting portion 2111B is arranged below the position of the second pivot 320B.

Referring to FIGS. 22 and 23 of the drawings, an alternative of the foldable cycle frame 3 for cycle according to the above fourth preferred embodiment of the present invention is illustrated, wherein the foldable cycle frame 3 comprises a front frame 10C, a back frame 20C, an actuating arm 30C, and a supporting element 40C. The back frame 20C comprises a back frame body 21C and a locking device 22C. The back frame body 21C comprises a lower end 211C pivotally arranged on the cycle body 2 of the cycle 1 and an upper end 212C pivotally arranged on the lower end 211C. The locking device 22C is arranged to unlockably lock the lower end 211C and the upper end 212C together. An end of the supporting element 40C is pivotally arranged on the upper end 212C of the back frame body 21C of the back frame 20C, while another end thereof is pivotally arranged on the cycle body 2. The actuating arm 30C is respectively pivotally arranged on the back frame 20C and the front frame 10B. Preferably, the back frame 20B of the foldable cycle frame 3 and the supporting element 40B of the present invention are arranged to be able to form an obtuse triangle with the cycle body 2 of the cycle 1.

Referring to FIGS. 22 and 23 of the drawings, a first connecting element 12C of the front frame 10C of the alternatively embodied foldable cycle frame 3 according to the foldable cycle frame 3 of the above fourth preferred embodiment of the present invention and the front end 31C of the actuating arm 30C form a first pivot 310C. Also, a lower end 211C of the back frame body 21C of the back frame 20C and a rear end 32C of the actuating arm 30C forms a second pivot 320C. The height of the position of the second pivot 320C is higher than the height of the position of the first pivot 310C. It is understandable that because the upper end 212C of the back frame 20C is pivotally arranged on the lower end 211C and the locking device 22C is able to lock the upper end 212C on the lower end 211C, the back frame 20C of the cycle frame 30C forms a pin joint site 2101C and a locked site 2102C, wherein the pin joint site 2101C and the locked site 2102C are both arranged between the upper end 212C and the lower end 211C. Preferably, the back frame body 21B of the back frame 20C forms an inner side 213C opposite to the front frame 10C and an opposite outer side 214C. The pin joint site 2101C is arranged on the inner side 213C of the back frame body 21B of the back frame 20C, while the locked site 2102C of the back frame 20B is arranged on the outer side 214C of the back frame body 21B of the back frame 20C. More preferably, the height of the position where the pin joint site 2101C of the back frame 20C is at is higher than the height of the position where the locked site 2102C of the back frame 20C is at.

Referring to FIG. 24 of the drawings, alternatively, the upper end 212B of the back frame body 21B of the back frame 20B of the exemplary electric vehicle 1 comprises a pivot portion 2121B. Besides, the back frame body 21B comprises a lock bar 2122B and both the upper end 212B and the lower end 211B of the back frame body 21B are hollow. Then an end of the lock bar 2122B is dismountably received (or sleeved) in the upper end 212B and the lower end 211B of the back frame body 21B, so as to connect the upper end 212B and the lower end 211B of the back frame body 21B together. The other end of the lock bar 2122B protrudes from the upper end 212B to provide support to the saddle 4. In other words, the lock bar 2122B can serve the function of unlockably locking the upper end 212B and the lower end 211B of the back frame body 21B together. It is understandable that the lock bar 2122B can be a solid column or a hollow pipe. The lock bar 2122B has certain rigidity, so as to connect the upper end 212B and the lower end 211B of the back frame body 21B together. Besides, when the user (or ridder) is sitting on the saddle 4, his/her weight will keep an end of the lock bar 2122B to be sleeved on the upper end 212B and the lower end 211B of the back frame body 21B, so as to ensure that the upper end 212B and the lower end 211B of the back frame body 21B are continuously connected together. Under such circumstances, the back frame body 21B of the back frame 20B of the exemplary electric vehicle 1 can unlockably lock the upper end 212B and the lower end 211B of the back frame body 21B together without setting up the locking device 22.

FIGS. 24-27 of the drawings illustrate an exemplary cycle 1 applying the foldable cycle frame 3 of the present invention, wherein the exemplary cycle 1 is an electric vehicle. The exemplary cycle 1 in the present specification is only provided for describing the foldable cycle frame 3 of the present invention, which shall not be considered as a limit of the foldable cycle frame 3 of the present invention. It is understandable that when the foldable cycle frame 3 of the present invention is utilized for other types of cycle, such as bicycle or other manpower cycles, person skilled in the art can directly, or with other simple modifications that do not depart from the spirit of the present invention, apply the foldable cycle frame 3 of the present invention to other types of cycle.

Referring to FIGS. 24-27 of the drawings, the exemplary electric vehicle 1 applying the foldable cycle frame 3 of the present invention comprises a cycle body 2, a cycle frame 3, a saddle 4 arranged on the cycle frame 3, a power unit 5, and a plurality of wheels 6. The wheels 6 are respectively arranged on the cycle body 2 and the cycle frame 3. It is understandable that the exemplary electric vehicle 1 further comprises two handles 7 or has the cycle frame 3 form two handles 7, so as to help the user to ride it. Preferably, the front frame body 11B of the front frame 10B of the foldable cycle frame 3 forms the handle 7. Referring to FIGS. 23-27 of the drawings, the front frame body 11B of the front frame 10B of the foldable cycle frame 3 according to the present invention further forms a griping portion 111 for the user to grasp and drag the electric vehicle. Alternatively, the handles 7 are respectively arranged on the two sides of the griping portion 111 of the front frame body 11B of the front frame 10B. Alternatively, the handles 7 of the exemplary electric vehicle 1 are respectively arranged on the two sides of the griping portion 111 of the front frame 10B.

Referring to FIGS. 24 and 25 of the drawings, the cycle body 2 forms a front 201 and a rear 202. The front frame 10B of the foldable cycle frame 3 is pivotally arranged on the front 201 of the cycle body 2. The back frame 20B of the foldable cycle frame 3 is pivotally arranged on the rear 202 of the cycle body 2. Referring to FIGS. 24 and 25 of the drawings, preferably, the cycle body 2 forms a receiving groove 203, wherein the receiving groove 203 is defined to receive the back frame 20B of the cycle frame 3 (or the lower end 211B of the back frame body 21B of the back frame 20B) therein.

Referring to FIG. 24 of the drawings, when the exemplary electric vehicle 1 according to the foldable cycle frame 3 of the present invention is in an unfolded state, the cycle frame 3 is remained unfolded so as to support and hold the saddle 4 at a horizontal position. Also, it makes the front frame 10B of the cycle frame 3 be unfolded and stay from the cycle body 2, such that the electric vehicle can be rid and move. Referring to FIG. 24 of the drawings, when the exemplary electric vehicle 1 is in a folded state, the back frame 20B of the cycle frame 3 is folded and received in the receiving groove 203 of the cycle body 2. The front frame 10B is folded on the back frame 20B of the cycle frame 3. The saddle 4 is folded in the middle the front frame 10B and the back frame 20B of the cycle frame 3. It is understandable that when the exemplary electric vehicle 1 is in the unfolded state, the front frame 10B of the cycle frame 3 and the back frame 20B are both held in the unfolded state. Referring to FIGS. 24-27 of the drawings, when the back frame 20B of the cycle frame 3 is folded, the upper end 212B of the back frame body 21B of the back frame 20B is folded on the lower end 211B, and the folded back frame 20B is received in the receiving groove 203 of the cycle body 2. It is understandable that the length of the receiving groove 203 of the cycle body 2 is not shorter than the maximum length of the folded back frame 20B. Preferably, the length of the receiving groove 203 of the cycle body 2 is not shorter than the maximum length of the lower end 211B of the back frame body 21B of the back frame 20B.

Referring to FIGS. 24 and 25 of the drawings, the locking catch 223B of the locking device 22B of the back frame 20B of the cycle frame 3 of the exemplary electric vehicle 1 according to the foldable cycle frame 3 of the present invention is arranged for unlockably locking the first locking element 221B and the second locking element 222B together, so as to, based on the user's needs, either keep the back frame 20B in the unfolded state in order to support the saddle 4 at a suitable position, or unlock the upper end 212B and the lower end 211B of the back frame 20B from each other, so that the back frame 20B can be folded and received in the receiving groove 203 of the cycle body 2. It is understandable that the locking device 22B can be any lock or locking mechanism that unlockably locks the upper end 212B and the lower end 211B of the back frame 20B together.

Referring to FIGS. 24-25 of the drawings, the supporting element 40B of the cycle frame 3 of the exemplary electric vehicle 1 that utilizes the foldable cycle frame 3 of the present invention is arranged between the back frame 20B and the rear 202 of the cycle body 2. An end of the supporting element 40B is pivotally arranged on the upper end 212B of the back frame 20B, while another end thereof is pivotally arranged on the rear 202 of the cycle body 2, so that when the back frame 20B of the cycle frame 3 is unfolded, the back frame body 21B of the back frame 20B of the cycle frame 3, the rear 202 of the cycle body 2, and the supporting element 40B of the cycle frame 3 form a triangular structure, so as to provide a steady support for the saddle 4 (or the user sitting on the saddle 4). Preferably, when the back frame 20B of the cycle frame 3 is unfolded, the included angle between the rear 202 of the cycle body 2 and the back frame body 21B of the back frame 20B of the cycle frame 3, the included angle between the back frame 20B of the cycle frame 3 and the supporting element 40B, and the included angle between the rear 202 of the cycle body 2 and the supporting element 40B are all acute angle. It is understandable that during the folding process of the back frame 31 of the cycle frame 3, the back frame 20B itself is folded, so that the upper end 212B of the back frame 20B is folded to the lower end 211B of the back frame 20B. Then after the back frame 20B is folded, it will be further folded into the receiving groove 203 of the cycle body 2.

Referring to FIGS. 24 and 25 of the drawings, an end of the supporting element 40B of the cycle frame 3 of the exemplary electric vehicle 1 that applies the foldable cycle frame 3 according to the present invention is arranged on the upper end 212B of the back frame 20B of the cycle frame 3. Another end of the back frame 20B is arranged in the receiving groove 203 of the cycle body 2, so that when the back frame 20B is folded and received in the receiving groove 203 of the cycle body 2, the supporting element 40B will be folded between the lower end 211B and the upper end 212B of the back frame 20B.

Referring to FIGS. 24 and 25 of the drawings, the front 201 of the cycle body 2 and the front frame 10B of the cycle frame 3 of the exemplary electric vehicle 1 that applies the foldable cycle frame 3 according to the present invention form a fourth pivot 2010B. The back frame 20B and the rear 202 of the cycle body 2 form a fifth hinge 2020B. The fourth pivot 2010B and the fifth hinge 2020B are respectively horizontally arranged. The first pivot 310B that is formed by the front frame 10B and the actuating arm 30B is at a position that is higher than the position of the second pivot 320B that is formed by the back frame 20B and the actuating arm 30B, such that when the back frame body 21B of the back frame 20B of the cycle frame 3 itself is folded and folded to the cycle body 2, the back frame body 21B of the back frame 20B is able to drive the front frame body 11B of the front frame 10B to pivot and fold toward the direction of the cycle body 2 via the actuating arm 30B. Besides, when the front frame body 11B of the front frame 10B is driven to pivot and fold toward the direction of the cycle body 2, the front frame 10B is able to lead the back frame body 21B of the back frame 20B of the cycle frame 3 to be folded to the cycle body 2 via the actuating arm 30B.

Referring to FIGS. 24 and 25 of the drawings, the front frame 10B of the exemplary electric vehicle 1 of the foldable cycle frame 3 according to the present invention comprises a front frame body 11B and a first connecting element 12B arranged between the front frame body 11B and the front 201 of the cycle body 2. An end of the first connecting element 12B is arranged on the front frame body 11B, while another end thereof is arranged on the front 201 of the cycle body 2 via the fourth pivot 2010B. The length from the fourth pivot 2010B to the front frame body 11B of the front frame 10B is L1. The length from the fifth hinge 2020B to the second pivot 320B is L2. The L1 length is greater than the L2 length. Referring to FIGS. 24 and 25 of the drawings, the first connecting element 12B of the front frame 10B of the exemplary electric vehicle 1 is respectively pivotally arranged on the front frame body 11B and the front 201 of the cycle body 2 and respectively forms the third pivot 120B with the front frame body 11B and forms the first pivot 310B with the front 201 of the cycle body 2.

Referring to FIGS. 24-25 of the drawings, the cycle body 2 of the exemplary electric vehicle 1 of the foldable cycle frame 3 according to the present invention comprises two plates 204 facing to each other, wherein the plates 204 form the receiving groove 203 therebetween. It is understandable that the structure formed with the two plate-type objects of the cycle body 2 allows the receiving groove 203 to be as big as possible and allows the weight of the cycle body 2 to be as light as possible. In order to reduce the weight of the cycle body 2 and enhance the strength of the cycle body 2 as possible, the cycle body 2 can be made of high intensity and low density material, such as carbon fiber material, high intensity alloy (like aluminum magnesium alloy). It is understandable that according to the needs of the objects of the the present invention, the plate 204 of the cycle body 2 can have any shape that is able to achieve the object(s) of the present invention. The shape can be regular or irregular.

Referring to FIGS. 24-25 the drawings, the shape and length of the supporting element 40B of the cycle frame 3 of the exemplary electric vehicle 1 according to the present invention is arranged according to the shape and length of the receiving groove 203 of the cycle body 2, so that the supporting element 40B can be received in the receiving groove 203. Preferably, an end of the supporting element 40B of the cycle frame 3 is arranged on the upper end 212B of the back frame 20B of the cycle frame 3, while another end of the back frame 20B is arranged on an inner wall 2041 of a plate 204 of the cycle body 2.

Referring to FIGS. 24 and 25 of the drawings, an end of the first connecting element 12B of the front frame 10B of the cycle frame 3 of the exemplary electric vehicle 1 according to the present invention is pivotally arranged between two plates 13 of the cycle body 2, such that the first connecting element 12B can pivot in a vertical direction relative to the plates 204. Another end of the first connecting element 12B is pivotally arranged on the front frame body 11B that is arranged to be able to pivot in a horizontal direction relative to the first connecting element, such that the front body 11B can pivot in the horizontal direction relative to the first connecting element 12B. Therefore, the exemplary electric vehicle 1 can change direction based on the riding conditions during the riding process.

Referring to FIGS. 24-28B of the drawings, the saddle 4 of the exemplary electric vehicle 1 of the foldable cycle frame 3 that applies the present invention forms an open slot 401. The saddle 4 is pivotally arranged on the upper end 212B of back frame body 21B of the back frame 20B of the cycle frame 3, so as to allow the saddle 4 to be pivoted to a supporting position and a folding position. When the saddle 4 is pivoted to the supporting position, the saddle 4 will be supported by the upper end 212B of the back frame body 21B of the back frame 20B and held horizontally for the user to sit thereon. When the saddle 4 is pivoted to the folding position, the saddle 4 will be folded to the upper end 212B of the back frame body 21B of the back frame 20B of the cycle frame 3. The saddle 4 then utilizes the open slot 401 to engage with the upper end 212B of the back frame body 21B of the back frame 20B. As a result, when the back frame 20B is folded on the cycle body 2, the saddle 4 can be away from supporting the front frame 10B and therefore, the size of the folded exemplary electric vehicle 1 can become as small as possible.

Referring to FIGS. 28A and 28B of the drawings, the saddle 4 of the exemplary electric vehicle 1 comprises a pivoting end 41, two supporting parts 42 respectively extended from the pivoting end 41, and a holding element 43. The open slot 401 of the saddle 4 forms between the two supporting parts 42. The pivoting end 41 of the saddle 4 and the holding element 43 form a pivot hole 402 therebetween extended between the two supporting parts 42 with the holding element 43, so that when the saddle 4 is pivoted to the supporting position, the saddle 4 will be supported by the upper end 212B of the 21B back frame body of the back frame 20B and held horizontally, while when the saddle 4 is pivoted to the folding position, the saddle 4 will be folded to the upper end 212B of the back frame body 21B of the back frame 20B of the cycle frame 3 and engaged with the upper end 212B of the back frame body 21B of the back frame 20B with the open slot 401. It is worth noted that the saddle 4 is supported by the upper end 212B of the back frame body 21B of the back frame 20B of the cycle frame 3 through the holding element 43 thereof and uses the supporting part 42 thereof to support the user thereabove. Therefore, the holding element 43 of the saddle 4 is made of high strength material. Preferably, the holding element 43 is made of high strength plastic material, so as to have advantages like light weight, and easy to be formed and processed.

Referring to FIGS. 28A and 28B of the drawings, the holding element 43 of the saddle 4 of the exemplary electric vehicle 1 forms a holding part 431 and two edge parts 432 respectively outwardly extended from the holding part 431. The supporting parts 42 and the holding part 431 of the holding element 43 form the open slot 401. The supporting parts 42 are respectively arranged on the edge parts 432 of the holding element 43. Preferably, the open slot 401 has a curvy profile. It is understandable that the supporting parts 42 respectively form a cushion layer 421 for the user to sit thereon. In addition, the supporting part 42 further forms a fastening layer 422 that is secured on the edge part 432 of the holding element 43.

Referring to FIGS. 24-27 of the drawings, the front frame body 11B of the front frame 10B of the exemplary electric vehicle 1 forms a casing 110B. The casing 110B forms a receiving chamber 1101B to receive a power unit 5 and a hub motor 8. The hub motor 8 is connected with the wheel 6, so as to drive the wheel 6 to rotate and drive the exemplary electric vehicle 1. It is understandable that the hub motor 8 can also be substituted be any other driving mechanism that can drive the wheel 6 to rotate. For example, combining a direct current motor and a transmission mechanism can drive the wheel 6 to rotate as well.

Referring to FIGS. 24-27 of the drawings, the exemplary electric vehicle 1 further comprises attachments 9. The attachments 9 may comprise two footrests 91 that are respectively arranged on the cycle body 2, two brakes 92 that are respectively arranged on the front frame 10B and the rear 202 of the cycle body 2, and electric wires that are respectively electronically arranged between the power unit 5 and the hub motor 8.

Those skilled in the art should understand that in the disclosure of the present invention, terms such as "longitudinal," "lateral," "upper," "lower," "front," "back," "left," "right," "perpendicular," "horizontal," "top," "bottom," "inner," "outer," etc., which indicate directions or positional relations are based on the directions or positional relations demonstrated in the figures and only to better describe the present invention and simplify the description, rather than to indicate or imply that the indicated device or element must be applied to a specific direction or be operated or constructed in a specific direction. Therefore, these terms shall not be considered limits of the present invention.

It is understandable that the term "a" should be considered as "at least one" or "one of more." That is to say, for an embodiment, the quantity of an element can be one, but for another embodiment, the quantity of the element can be many. Therefore, the term "a" shall not be considered as a limit for quantity.

Those skilled in the art should understand that the embodiments of the present invention illustrated in the above description and the appended drawings are only to give examples rather than limit the present invention.

The objects of the present invention can be therefore completely and effectively achieved. The embodiments for describing the functions and structural principles of the present invention have been fully illustrated and described. Also, the present invention shall not be limited by the changes based on these principles of the embodiments. Hence, the present invention comprises all the changes within the scope and spirit claimed by the appended claims.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A foldable electric vehicle, comprising:
   a vehicle body;
   a front body, pivotally arranged on a front of said vehicle body;
   a vehicle frame, arranged on a rear of said vehicle body;
   a power unit, adapted for providing power to said foldable electric vehicle;
   a saddle, arranged on said vehicle frame;
   a plurality of wheels, wherein said wheels are respectively arranged at said vehicle body and said front body;
   two handles, respectively arranged on said front body; and
   a driving motor, electronically connected with said power unit and connected with at least a wheel to drive said wheel to rotate and drive said foldable electric vehicle to move, wherein said vehicle frame comprises a back frame pivotally arranged on said rear of said vehicle body, wherein said vehicle body forms a receiving groove, wherein said foldable electric vehicle has an unfolded state and a folded state, wherein when said foldable electric vehicle is in said unfolded state, said back frame of said vehicle frame is kept unfolded and upright to support and hold said saddle at a proper position, and said front body is unfolded and kept apart from said vehicle body; when said foldable electric vehicle is in said folded state, said back frame of said vehicle frame is capable of being folded and said folded back frame is capable of being received in said receiving groove of said vehicle body, and said front body is capable of being folded at said back frame that is received in said receiving groove.

2. The foldable electric vehicle, as recited in claim 1, wherein said back frame comprises a lower end, an upper end extended upwardly from said lower end and a connecting pivot, wherein said lower end of said back frame is pivotally arranged on said upper end via said connecting pivot, wherein said connecting pivot is arranged toward said rear of said vehicle body.

3. The foldable electric vehicle, as recited in claim 2, wherein said vehicle frame further comprises a supporting element, wherein an end of said supporting element is pivotally arranged on said upper end of said back frame, and another end of said supporting element is pivotally arranged on said rear of said vehicle body, so that when said foldable electric vehicle is in said unfolded state, said back frame of said vehicle frame, said rear of said vehicle body and said supporting element form a triangular structure.

4. The foldable electric vehicle, as recited in claim 3, wherein an end of said supporting element of said vehicle frame is arranged on said upper end of said back frame of said vehicle frame, and another end of said back frame is arranged on an inner wall of a plate of said vehicle body.

5. The foldable electric vehicle, as recited in claim 2, wherein said vehicle frame further comprises a locking device arranged on an inner side of said back frame of said vehicle frame, wherein said locking device has a locked state and a unlocked state, wherein when said locking device is in said locked state, said lower end and said upper end of said back frame are stably locked together, and when said locking device is in said unlocked state, said upper end of said back frame is capable of freely pivoting relative to said lower end.

6. The foldable electric vehicle, as recited in claim 1, wherein said vehicle frame further comprises an actuating arm, wherein said front body is pivotally arranged on an end of said actuating arm via a first pivot, and said back frame of said vehicle frame is pivotally arranged on another end of said actuating arm via a second pivot, wherein said first pivot is located at a position higher than said second pivot.

7. The foldable electric vehicle, as recited in claim 1, wherein said front body is pivotally arranged on said front of said vehicle body via a third pivot, and said back frame of said vehicle frame is pivotally arranged on said rear of said vehicle body via a fourth pivot, wherein when said foldable electric vehicle is in said unfolded state, said first pivot is located at a position higher than said third pivot, and said fourth pivot is located at a position higher than said second pivot.

8. The foldable electric vehicle, as recited in claim 7, wherein said front body comprises a front holding body and a first connecting element arranged between said front holding body and said front of said vehicle body, wherein an end of said first connecting element of said front body is pivotally arranged on said front holding body, another end of said first connecting element is pivotally arranged in said receiving groove of said vehicle body via said third pivot, and said back frame of said vehicle frame is pivotally arranged in said receiving groove of said vehicle body via said fourth pivot.

9. The foldable electric vehicle, as recited in claim 8, wherein a distance between said third pivot and said front holding body of said front body is L1, and a distance between said fourth pivot and said second pivot is L2, wherein the distance of L1 is greater than the distance of L2.

10. The foldable electric vehicle, as recited in claim 1, wherein said vehicle body comprises two plates facing to each other, wherein said receiving groove is defined between two said plates.

11. The foldable electric vehicle, as recited in claim 1, wherein said front holding body of said front body forms a casing, wherein said casing forms a receiving chamber for receiving said power unit therein.

12. The foldable electric vehicle, as recited in claim 1, wherein said saddle forms an open slot and is pivotally arranged on said upper end of said back frame of said vehicle frame, wherein said saddle is capable of being pivoted between a supporting position and a folding position, wherein when said saddle is pivoted to said supporting position, said saddle is horizontally supported and held by said upper end of said back frame, and when said saddle is pivoted to said folding position, said saddle is folded at said back frame of said vehicle frame and said saddle is capable of being engage with said upper end of said back frame by utilizing said open slot thereof.

13. A foldable vehicle frame for an electric vehicle having a vehicle body, comprising:
  a back frame, which comprising a lower end adapted for being pivotally arranged on said vehicle body and an upper end pivotally arranged on said lower end of said frame;
  a locking device unlockably arranged on an inner side of said back frame, wherein said locking device has a locked state and a unlocked state, wherein when said locking device is in said locked state, said lower end and said upper end of said back frame are stably locked together, and when said locking device is in said unlocked state, said upper end of said back frame is capable of freely pivoting relative to said lower end;
  a supporting element, wherein an end of said supporting element is adapted for being pivotally arranged on said upper end of said back frame, and another end of said supporting element is pivotally arranged on said vehicle body, so that when said back frame is held upright, said back frame, said vehicle body and said supporting element form a triangular structure; and
  an actuating arm and a front frame, wherein said actuating arm is arranged between said front frame and said back frame, wherein said front frame is pivotally arranged on an end of said actuating arm via a first pivot, and said back frame is pivotally arranged on another end of said actuating arm via a second pivot; wherein said front frame is adapted for being pivotally arranged on said vehicle body via a third pivot, and said back frame is adapted for being pivotally arranged on said vehicle body via a fourth pivot, wherein when said foldable vehicle frame is in an unfolded state, said first pivot is located at a position higher than said third pivot, and said fourth pivot is located at a position higher said second pivot.

14. The foldable vehicle frame, as recited in claim 13, wherein said front frame comprises a front holding body and a first connecting element arranged on said front holding body, wherein said first connecting element of said front frame is pivotally arranged on said actuating arm via said first pivot, wherein an end of said first connecting element of said front frame is pivotally arranged on said front holding body, and another end of said first connecting element is pivotally arranged on said vehicle body via said third pivot.

15. The foldable vehicle frame, as recited in claim 14, a distance L1 between said third pivot and said front holding body is longer than a distance L2 between said fourth pivot and said second pivot.

* * * * *